(12) United States Patent
Liang

(10) Patent No.: US 12,278,382 B1
(45) Date of Patent: Apr. 15, 2025

(54) END COVER ASSEMBLY, ENERGY-STORAGE DEVICE, AND ELECTRICITY-CONSUMPTION DEVICE

(71) Applicant: Xiamen Hithium Energy Storage Technology Co., Ltd., Fujian (CN)

(72) Inventor: Jinyun Liang, Fujian (CN)

(73) Assignee: Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/913,847

(22) Filed: Oct. 11, 2024

(30) Foreign Application Priority Data

Oct. 13, 2023 (CN) .......................... 202311323027.X

(51) Int. Cl.
*H01M 50/15* (2021.01)
*H01M 50/103* (2021.01)
*H01M 50/143* (2021.01)
*H01M 50/317* (2021.01)

(52) U.S. Cl.
CPC ......... *H01M 50/15* (2021.01); *H01M 50/103* (2021.01); *H01M 50/143* (2021.01); *H01M 50/317* (2021.01); *H01M 2220/10* (2013.01)

(58) Field of Classification Search
CPC .. H01M 50/15; H01M 50/146; H01M 50/106; H01M 50/317; H01M 2220/10
See application file for complete search history.

(56) References Cited

U.S. PATENT DOCUMENTS

2022/0336913 A1    10/2022   Gu et al.

FOREIGN PATENT DOCUMENTS

| CN | 205882038 U | 1/2017 |
|----|-------------|--------|
| CN | 207409523 U | 5/2018 |
| CN | 207489979 U | 6/2018 |
| CN | 208195676 U | 12/2018 |
| CN | 112886110 A | 6/2021 |
| CN | 215816254 U | 2/2022 |
| CN | 216120619 U | 3/2022 |
| CN | 216624418 U | 5/2022 |
| CN | 218385459 U | 1/2023 |
| CN | 218939935 U | 4/2023 |

(Continued)

OTHER PUBLICATIONS

CNIPA, First Office Action issued in corresponding Chinese Patent Application No. 202311323027.X, Nov. 12, 2023, 22 pages.

(Continued)

*Primary Examiner* — Jane J Rhee
(74) *Attorney, Agent, or Firm* — IP Spring

(57) ABSTRACT

An end cover assembly, an energy-storage device, and an electricity-consumption device are disclosed in the present disclosure. The end cover assembly includes a top cover, an explosion-proof valve, and a protective sheet. The top cover has a first mounting surface and a second mounting surface. The top cover defines a first mounting recess, an explosion-proof hole, and a vent recess, where the first mounting recess is recessed from the first mounting surface, and the vent recess is in communication with the explosion-proof hole. The explosion-proof valve is attached to the second mounting surface and covers an opening of the explosion-proof hole positioned on the second mounting surface. The protective sheet is attached to the bottom wall of the first mounting recess and covers an opening of the explosion-proof hole positioned on the bottom wall of the first mounting recess and the other part of the vent recess.

20 Claims, 10 Drawing Sheets

(56) References Cited

FOREIGN PATENT DOCUMENTS

| | | |
|---|---|---|
| CN | 116169304 A | 5/2023 |
| CN | 219017784 U | 5/2023 |
| CN | 221379548 U | 7/2024 |
| CN | 221651643 U | 9/2024 |
| JP | 6225223 B1 | 11/2017 |
| KR | 20160021519 A | 2/2016 |
| SU | 851653 A1 | 7/1981 |
| WO | 2023141902 A1 | 8/2023 |

OTHER PUBLICATIONS

CNIPA, Notice of Allowance issued in corresponding Chinese Patent Application No. 202311323027.X, Jan. 9, 2024, 11 pages.
CNIPA, International Search Report and Written Opinion for International Patent Application No. PCT/CN2024/109765, Nov. 1, 2024, 20 pages.

END COVER ASSEMBLY, ENERGY-STORAGE DEVICE, AND ELECTRICITY-CONSUMPTION DEVICE

CROSS-REFERENCE TO RELATED APPLICATIONS

This application claims priority under 35 U.S.C. § 119 (a) to and the benefit of Chinese Patent Application No. 202311323027.X, filed Oct. 13, 2023, the entire disclosure of which is incorporated herein by reference.

TECHNICAL FIELD

This disclosure relates to the field of energy-storage technologies, and in particular to an end cover assembly, an energy-storage device, and an electricity-consumption device.

BACKGROUND

Existing energy-storage devices generally include an end cover assembly, and the end cover assembly generally includes a top cover, a protective sheet, an explosion-proof valve, etc. The protective sheet and the explosion-proof valve are usually mounted on the top cover. The explosion-proof valve is used to release pressure when the pressure inside the energy-storage device is too high, and the protective sheet is used to protect the explosion-proof valve.

SUMMARY

In a first aspect of the present disclosure, an end cover assembly is provided. The end cover assembly includes a top cover, an explosion-proof valve, and a protective sheet. The top cover has a first mounting surface and a second mounting surface, where the first mounting surface is positioned facing away from the second mounting surface in a thickness direction of the top cover. The top cover defines a first mounting recess, an explosion-proof hole, and a vent recess, where the first mounting recess is recessed from the first mounting surface, the explosion-proof hole extends through a bottom wall of the first mounting recess and the second mounting surface, one part of the vent recess is recessed from the first mounting surface, the other part of the vent recess is recessed from the bottom wall of the first mounting recess, and the vent recess is in communication with the explosion-proof hole. A width K1 of the vent recess gradually increases in an extension direction of the vent recess. A width of one end of the vent recess in communication with the explosion-proof hole is smaller than a width of the other end of the vent recess away from the explosion-proof hole. A depth H1 of the vent recess gradually increases in an extension direction of the vent recess. A depth of one end of the vent recess in communication with the explosion-proof hole is smaller than a depth of the other end of the vent recess away from the explosion-proof hole. The explosion-proof valve is attached to the second mounting surface and covers an opening of the explosion-proof hole positioned on the second mounting surface. The protective sheet is attached to the bottom wall of the first mounting recess and covers an opening of the explosion-proof hole positioned on the bottom wall of the first mounting recess and the other part of the vent recess. The protective sheet has a protective peripheral surface. The protective peripheral surface and a side wall of the first mounting recess defines an avoidance gap, and the avoidance gap is in communication with the vent recess. A vent is defined at one end of the vent recess away from the explosion-proof hole, and the vent is recessed from the first mounting surface.

In a second aspect of the present disclosure, an energy-storage device is provided. The energy-storage device includes a housing, an electrode assembly, and an end cover assembly. The housing has an opening, the housing defines an accommodating chamber, the electrode assembly is accommodated in the accommodating chamber, and the end cover assembly covers the opening. The end cover assembly includes a top cover, an explosion-proof valve, and a protective sheet. The top cover has a first mounting surface and a second mounting surface, where the first mounting surface is positioned facing away from the second mounting surface in a thickness direction of the top cover. The top cover defines a first mounting recess, an explosion-proof hole, and a vent recess, where the first mounting recess is recessed from the first mounting surface, the explosion-proof hole extends through a bottom wall of the first mounting recess and the second mounting surface, one part of the vent recess is recessed from the first mounting surface, the other part of the vent recess is recessed from the bottom wall of the first mounting recess, and the vent recess is in communication with the explosion-proof hole. A width K1 of the vent recess gradually increases in an extension direction of the vent recess. A width of one end of the vent recess in communication with the explosion-proof hole is smaller than a width of the other end of the vent recess away from the explosion-proof hole. A depth H1 of the vent recess gradually increases in an extension direction of the vent recess. A depth of one end of the vent recess in communication with the explosion-proof hole is smaller than a depth of the other end of the vent recess away from the explosion-proof hole. The explosion-proof valve is attached to the second mounting surface and covers an opening of the explosion-proof hole positioned on the second mounting surface. The protective sheet is attached to the bottom wall of the first mounting recess and covers an opening of the explosion-proof hole positioned on the bottom wall of the first mounting recess and the other part of the vent recess. The protective sheet has a protective peripheral surface. The protective peripheral surface and a side wall of the first mounting recess defines an avoidance gap, and the avoidance gap is in communication with the vent recess. A vent is defined at one end of the vent recess away from the explosion-proof hole, and the vent is recessed from the first mounting surface.

In a third aspect of the present disclosure, an electricity-consumption device is provided. The electricity-consumption device includes an energy-storage device. The energy-storage device is configured to power the electricity-consumption device. The energy-storage device includes a housing, an electrode assembly, and an end cover assembly. The housing has an opening, the housing defines an accommodating chamber, the electrode assembly is accommodated in the accommodating chamber, and the end cover assembly covers the opening. The end cover assembly includes a top cover, an explosion-proof valve, and a protective sheet. The top cover has a first mounting surface and a second mounting surface, where the first mounting surface is positioned facing away from the second mounting surface in a thickness direction of the top cover. The top cover defines a first mounting recess, an explosion-proof hole, and a vent recess, where the first mounting recess is recessed from the first mounting surface, the explosion-proof hole extends through a bottom wall of the first mounting recess and the second mounting surface, one part of the vent recess is recessed from the first mounting surface, the other part of the vent recess is recessed from the bottom wall of the first mounting recess, and the vent recess is in communication with the explosion-proof hole. A width K1 of the vent recess gradually increases in an extension direction of the vent recess. A width of one end of the vent recess in communication with the explosion-proof hole is smaller than a width of the other end of the vent recess away from the explosion-proof hole. A depth H1 of the vent recess gradually increases in an extension direction of the vent recess. A depth of one end of the vent recess in communication with the explosion-proof hole is smaller than a depth of the other end of the vent recess away from the explosion-proof hole. The explosion-proof valve is attached to the second mounting surface and covers an opening of the explosion-proof hole positioned on the second mounting surface. The protective sheet is attached to the bottom wall of the first mounting recess and covers an opening of the explosion-proof hole positioned on the bottom wall of the first mounting recess and the other part of the vent recess. The protective sheet has a protective peripheral surface. The protective peripheral surface and a side wall of the first mounting recess defines an avoidance gap, and the avoidance gap is in communication with the vent recess. A vent is defined at one end of the vent recess away from the explosion-proof hole, and the vent is recessed from the first mounting surface.

BRIEF DESCRIPTION OF THE DRAWINGS

To describe technical solutions in the present disclosure more clearly, the following briefly introduces accompanying drawings required for describing implementations.

DETAILED DESCRIPTION

Figure 1:
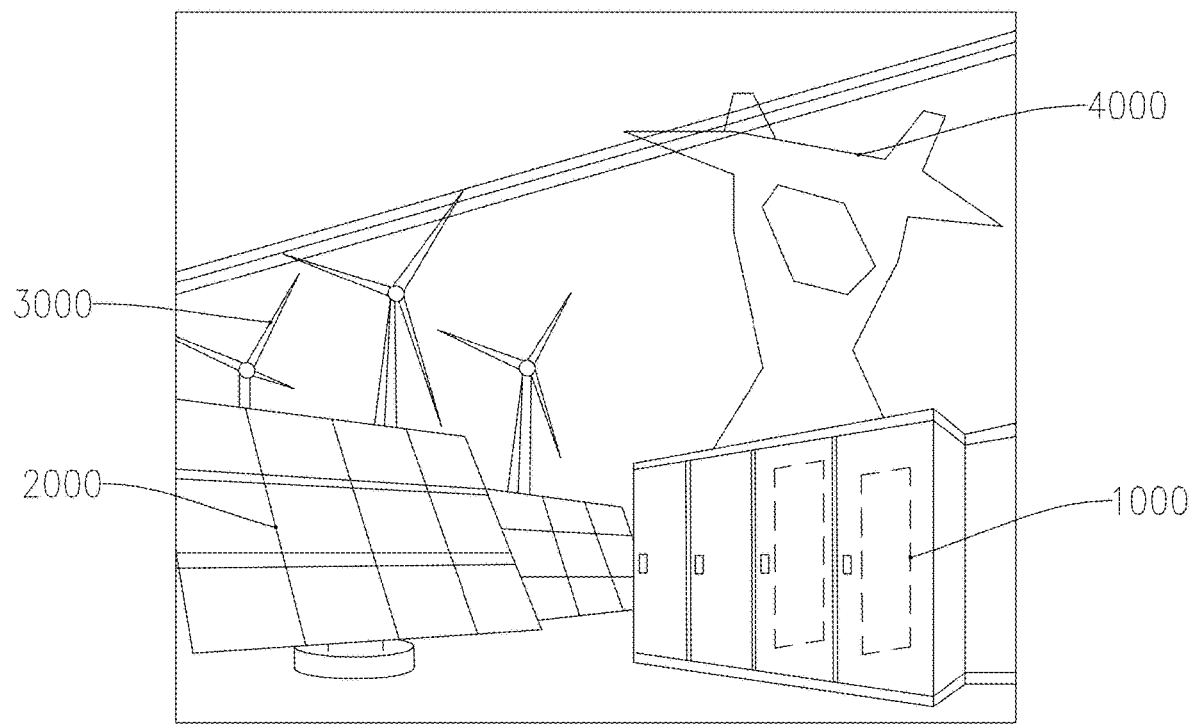
FIG. 1 is a diagram illustrating an application scenario of an energy-storage device provided in implementations of the present disclosure.

Technical solutions in implementations of the present disclosure will be clearly and completely described below in conjunction with accompanying drawings in implementations of the present disclosure.

Since the energy needed by people has high temporal and spatial characteristics, in order to rationally utilize the energy and improve energy utilization, a medium or a device is needed to store the energy in an original form or the energy converted into other forms, and then to release the energy in a specific form based on future application needs. As can be seen, in order to achieve the goal of carbon neutrality, a current main way to generate green electricity is to develop green energy such as photovoltaics, wind power, etc., to replace fossil energy. At present, the generation of green electricity generally depends on photovoltaics, wind power, hydropower, etc., while wind energy, solar energy, etc., generally have problems of strong intermittency and high volatility. As a result, the power grid is unstable, electricity generated during peak hours is insufficient, electricity generated during low-usage hours is too much, and unstable voltage will damage the provision of electricity. Therefore, insufficient electricity consumption or insufficient grid acceptance capacity may cause a problem of "curtailment of wind power and solar power", and energy storage is required to solve the problem. In other words, electricity is converted into other forms of energy by physical or chemical means and is stored, and then the stored energy is converted into electricity to be released when needed. Briefly, energy storage is like a large "power bank". When photovoltaics and wind energy are sufficient, the electricity is stored, and the stored electricity is released when needed.

Taking electrochemical energy storage as an example, an energy-storage device is provided in the present disclosure. The energy-storage device includes a set of chemical batteries, chemical elements in the chemical batteries are mainly used as energy-storage media, and a charging and discharging process is accompanied by chemical reactions or changes in the energy-storage media. Briefly, the electricity generated by wind energy and solar energy is stored in the chemical batteries, and the stored electricity is released when the consumption of external electricity reaches its peak or is transferred to places where electricity is scarce.

At present, energy storage (i.e. stored energy) has a wide range of application scenarios, including (wind and solar) power generation side energy storage, grid side energy storage, base station side energy storage, and user side energy storage. Corresponding types of energy-storage devices include the following.

(1) a large energy storage container applicable in grid side energy storage scenarios, which can serve as a high-quality active and reactive power regulation power supply in the grid, achieves load matching of electricity in time and space, enhances the absorption or integration capacity of the renewable energy, and are of great significance in grid system backup, alleviation of power supply pressure during peak hours, and peak and frequency regulation.

(2) a small and medium-sized energy-storage cabinet used in industrial and commercial energy-storage scenarios (banks, shopping malls, etc.) on the user side mainly operates in the "peak cut" mode. There is a large price difference in electricity charges at peak hours and at low hours of electricity consumption. Therefore, when a user has an energy-storage device, the user usually charges the energy-storage cabinet/box during a low electricity price period to reduce costs, and the electricity stored in the energy-storage device is discharged for use during a peak electricity price period to save electricity costs.

In the current end cover assembly, air pressure in a gap between the explosion-proof valve and the protective sheet is relatively high, resulting in a decrease in the accuracy of an explosion threshold of the explosion-proof valve.

The present disclosure is intended to provide an end cover assembly, an energy-storage device, and an electricity-consumption device. In the present disclosure, air pressure in a gap between an explosion-proof valve and a protective sheet can remain at normal pressure, thereby improving the accuracy of an explosion threshold of the explosion-proof valve.

In a first aspect of the present disclosure, an end cover assembly is provided. The end cover assembly includes a top cover, an explosion-proof valve, and a protective sheet. The top cover has a first mounting surface and a second mounting surface, where the first mounting surface is positioned facing away from the second mounting surface in a thickness direction of the top cover. The top cover defines a first mounting recess, an explosion-proof hole, and a vent recess, where the first mounting recess is recessed from the first mounting surface, the explosion-proof hole extends through a bottom wall of the first mounting recess and the second mounting surface, one part of the vent recess is recessed from the first mounting surface, the other part of the vent recess is recessed from the bottom wall of the first mounting recess, and the vent recess is in communication with the explosion-proof hole. The explosion-proof valve is attached to the second mounting surface and covers an opening of the explosion-proof hole positioned on the second mounting surface. The protective sheet is attached to the bottom wall of the first mounting recess and covers an opening of the explosion-proof hole positioned on the bottom wall of the first mounting recess and the other part of the vent recess.

The first mounting surface defines the first mounting recess, and the first mounting recess is used to accommodate the protective sheet, so that a space occupied by the protective sheet at least partially overlaps a space occupied by the top cover in the thickness direction of the top cover. In this way, the size of the top cover in the thickness direction of the top cover can be fully utilized, and the end cover assembly 100 can be more compact.

When the protective sheet is mounted in the first mounting recess, the vent recess is in communication with the explosion-proof hole with the outside, so that air inside the explosion-proof hole can be discharged in time after the protective sheet is attached. In this way, when the protective sheet is attached to the bottom wall of the first mounting recess, air pressure does not become larger because the air inside the explosion-proof hole can be discharged in time. Therefore, an attachment position of the protective sheet will not shift due to a relatively large air pressure, and the protective sheet will not wrinkle under the action of the relatively large air pressure, thereby improving the accuracy of the attachment position of the protective sheet and reducing the risk of wrinkling on the protective sheet.

In addition, even if the explosion-proof valve and the protective sheet seal the explosion-proof hole, the vent recess can also be in communication with the explosion-proof hole with the outside, so that the air inside the explosion-proof hole can be discharged to the outside through the vent recess. In this way, the air pressure in the explosion-proof hole is not too large, and the air pressure in the explosion-proof hole remains at normal pressure, thereby improving the accuracy of the explosion threshold of the explosion-proof valve.

In addition, the one part of the vent recess is recessed from the first mounting surface, and the other part of the vent recess is recessed from the bottom wall of the first mounting recess, so that the two parts of the vent recess have a height difference, and the vent recess is L-shaped. The one part of the vent recess positioned on the first mounting surface is exposed to the outside, so that the air inside the explosion-proof hole can be ensured to flow to the outside. The other part of the vent recess positioned on the bottom wall of the first mounting recess is blocked by the protective sheet, which reduces an area of the vent recess exposed to the outside and reduces the risk of foreign matter getting into the vent recess, so that the foreign matter can be effectively prevented from entering the explosion-proof hole, and the explosion threshold is not affected.

The first mounting recess is provided with supporting protrusions on the bottom wall of the first mounting recess, and the supporting protrusions are disposed at two sides of the vent recess in a width direction of the vent recess. The protective sheet has a protective layer and an adhesive layer, where the protective layer is stacked with the adhesive layer in a thickness direction of the protective sheet, the adhesive layer is adhered to the bottom wall of the first mounting recess, the supporting protrusions abut against the adhesive layer, the adhesive layer defines a vent channel, and the vent channel is in communication with the vent recess.

The adhesive layer of the protective sheet only has the vent channel positioned facing toward the vent recess, and other areas of the adhesive layer of the protective sheet are all separated from the vent recess by the supporting protrusions, which prevents the other areas of the adhesive layer of the protective sheet from flowing downward under the action of gravity, so that the adhesive layer does not block the vent recess, and thus the safety performance of the battery can be improved. In addition, the adhesive layer of the protective sheet positioned facing toward the vent channel has very little adhesive, and even if the adhesive flows downward to the vent recess, the vent recess is not blocked.

Specifically, metal around the vent recess is squeezed and accumulated on the two sides of the vent recess to form ridge-shaped supporting protrusions. When the protective sheet is attached to the bottom wall of the first mounting recess, and the adhesive layer of the protective sheet is supported by the ridge-shaped supporting protrusions to define a larger vent channel, so that the adhesive layer does not flow downward to block the vent recess under the action of gravity, thereby improving the safety performance of the energy-storage device.

A width K1 of the vent recess gradually increases in an extension direction of the vent recess, and a width of one end of the vent recess in communication with the explosion-proof hole is smaller than a width of the other end of the vent recess away from the explosion-proof hole. In other words, the vent recess is roughly "trumpet-shaped", so that the air inside the explosion-proof hole is easy to be discharged to the outside through the vent recess, while outside air is difficult to enter the explosion-proof hole through the vent recess. In this way, the air pressure in the explosion-proof hole does not rise, and the air pressure in the explosion-proof hole remains at normal pressure. In addition, the explosion-proof valve can be prevented from being adhered to and corroded by external moist air for a long time, so that the accuracy of the explosion threshold is not affected, and the safety performance of the energy-storage device is improved.

The width of the one end of the vent recess in communication with the explosion-proof hole is 0.25 mm, and the width of the other end of the vent recess away from the explosion-proof hole is 0.85 mm.

A depth H1 of the vent recess gradually increases in the extension direction of the vent recess, and a depth of the one end of the vent recess in communication with the explosion-proof hole is smaller than a depth of the other end of the vent recess away from the explosion-proof hole.

In this case, the air inside the explosion-proof hole is easier to be discharged to the outside through the vent recess, while the outside air is more difficult to enter the explosion-proof hole through the vent recess, so that the air pressure in the explosion-proof hole does not rise, and the air pressure in the explosion-proof hole remains at normal pressure. Meanwhile, the foreign matter can be prevented from entering the explosion-proof hole through the vent recess, and when water vapor enters the vent recess, the water vapor can be collected at the bottom of the vent recess and evaporate back to the outside air with heat generated by charging and discharging of the energy-storage device, so that the water vapor will not enter the explosion-proof hole to corrode the explosion-proof valve, thereby improving the safety of the energy-storage device.

A difference between the depth of the one end of the vent recess in communication with the explosion-proof hole and the depth of the other end of the vent recess away from the explosion-proof hole is 0.25 mm.

The protective sheet has a first protective surface and a second protective surface, and the first protective surface is positioned facing away from the second protective surface in the thickness direction of the protective sheet. When the protective sheet is accommodated in the first mounting recess, a thickness of the protective sheet is smaller than a depth of the first mounting recess in the thickness direction of the top cover, the second protective surface is fixedly connected to the bottom wall of the first mounting recess, and the first protective surface is lower than the first mounting surface. In this case, when the protective sheet is mounted in the first mounting recess, the protective sheet is completely embedded in the first mounting recess, and the first protective surface of the protective sheet is lower than the first mounting surface, so that the protective sheet does not fall off due to accidental scratches, thereby improving the product yield.

The depth of the first mounting recess is 0.22 mm, and the thickness of the protective sheet is 0.18 mm. In this case, the protective sheet can be completely embedded in the first mounting recess, and thus the protective sheet does not exceed the first mounting recess. Moreover, the thickness of the protective sheet can be guaranteed, and thus the protective sheet has a good protective effect and is easy to process.

The protective sheet further has a protective peripheral surface, and the protective peripheral surface is connected between the first protective surface and the second protective surface. The protective peripheral surface and a side wall of the first mounting recess define an avoidance gap, and the avoidance gap is in communication with the vent recess. In this way, the air inside the explosion-proof hole can be discharged through a vent and the avoidance gap at the same time, so that the efficiency of discharging the air inside the explosion-proof hole can be improved, and the air pressure in the explosion-proof hole is not too high.

A width of the avoidance gap in a width direction of the top cover is 0.2 mm.

A vent is defined at one end of the vent recess away from the explosion-proof hole, and the vent is recessed from the first mounting surface.

A periphery wall of the explosion-proof hole further defines a second mounting recess, and the second mounting recess is recessed from the second mounting surface. The explosion-proof valve is disposed in the second mounting recess. The second mounting recess is used to accommodate the explosion-proof valve, which can make the end cover assembly more compact.

The end cover assembly further includes a lower plastic, and the lower plastic is mounted on the second mounting surface of the top cover. The lower plastic has an explosion-proof grid, and the explosion-proof grid exceeds the second mounting surface. An avoidance recess is defined in the middle of a side of the explosion-proof grid away from the second mounting surface, and the avoidance recess is recessed from the second mounting surface to the first mounting surface. When multiple end cover assemblies are stacked, an avoidance recess of one end cover assembly is used to avoid a protective sheet of another adjacent end cover assembly to prevent the protective sheet from falling off due to scratches by an adjacent explosion-proof plate, thereby increasing the product yield.

The avoidance recess has a sinking portion and two step-portions, and the two step-portions are connected to two opposite sides of the sinking portion in a width direction of the lower plastic. A width of the first mounting recess is smaller than a width of the sinking portion in a width direction of the end cover assembly. An avoidance gap is defined between one step portion and one side of an orthographic projection of the first mounting recess on the sinking portion and the other avoidance gap is defined between the other step portion and the other side of the orthographic projection of the first mounting recess on the sinking portion. When the multiple end cover assemblies are stacked, the avoidance gap S can prevent the two step-portions of the avoidance recess from scratching the protective sheet of the adjacent end cover assembly, thereby improving the product yield.

A width of the avoidance gap Sis 1.9 mm.

Each of the two step-portions has an arc-shaped connecting surface.

The top cover further defines a mounting hole, and the mounting hole extends through the first mounting surface and the second mounting surface. The end cover assembly further includes a lower plastic and a pole, and the lower plastic is mounted on the second mounting surface of the top cover. The lower plastic has an upper surface and a lower surface, and the upper surface is positioned facing away from the lower surface in a thickness direction of the lower plastic. The lower plastic is provided with an assembly hole and protrusions. The assembly hole extends through the upper surface and the lower surface, the protrusions protrude from an edge of the lower surface, and a distance between a surface of each of the protrusions away from the lower surface and the lower surface is a first distance. The lower plastic is mounted on the second mounting surface of the top cover, the assembly hole is in communication with the mounting hole, and the pole passes through the assembly hole and the mounting hole. The pole has a first end face oriented in the same direction as the lower surface, the first end face is positioned on a side of the lower surface away from the upper surface, and a distance between the first end face and the lower surface is a second distance. The second distance is less than the first distance.

When the pole and a connector are welded, a surface of the connector will have prismatic indentations. A second distance L2 is set to be less than a first distance L1, so that the lower plastic is not scratched by the prismatic indentations of the connector, and thus the connector does not fall off, thereby preventing a short circuit inside the battery.

The pole further has a second end face opposite to the first end face, the second end face is positioned on a side of the first mounting face away from the second mounting face, and a distance between the second end face and the first mounting face is a third distance. The first end face is covered with an insulating film, and a thickness of the insulating film is a fourth distance. The first distance is greater than a sum of the second distance, the third distance, and the fourth distance.

In other words, a sum of a height of the pole exceeding the lower surface of the lower plastic, a height of the pole exceeding the first mounting surface of the top cover, and the thickness of the insulating film is smaller than a height of the protrusions protruding from the lower surface of the lower plastic. Therefore, when the multiple end cover assemblies are stacked, a negative pole of a lower end cover assembly does not scratch a blue insulating film of an upper end cover assembly.

In a second aspect of the present disclosure, an energy-storage device is provided. The energy-storage device includes a housing, an electrode assembly, and the end cover assembly in the first aspect of the present disclosure. The housing defines an opening and an accommodating chamber, the electrode assembly is accommodated in the accommodating chamber, and the end cover assembly covers the opening.

In a third aspect of the present disclosure, an electricity-consumption device is provided. The electricity-consumption device includes the energy-storage device in the second aspect of the present disclosure. The energy-storage device is configured to power the electricity-consumption device.

The first mounting surface defines the first mounting recess, and the first mounting recess is used to accommodate the protective sheet, so that a space occupied by the protective sheet at least partially overlaps a space occupied by the top cover in the thickness direction of the top cover. In this way, the size of the top cover in the thickness direction of the top cover can be fully utilized, and the end cover assembly 100 can be more compact.

When the protective sheet is mounted in the first mounting recess, the vent recess is in communication with the explosion-proof hole with the outside, so that air inside the explosion-proof hole can be discharged in time after the protective sheet is attached. In this way, when the protective sheet is attached to the bottom wall of the first mounting recess, air pressure does not become larger because the air inside the explosion-proof hole can be discharged in time. Therefore, an attachment position of the protective sheet will not shift due to a relatively large air pressure, and the protective sheet will not wrinkle under the action of the relatively large air pressure, thereby improving the accuracy of the attachment position of the protective sheet and reducing the risk of wrinkling on the protective sheet.

In addition, even if the explosion-proof valve and the protective sheet seal the explosion-proof hole, the vent recess can also be in communication with the explosion-proof hole with the outside, so that the air inside the explosion-proof hole can be discharged to the outside through the vent recess. In this way, the air pressure in the explosion-proof hole is not too large, and the air pressure in the explosion-proof hole remains at normal pressure, thereby improving the accuracy of the explosion threshold of the explosion-proof valve.

In addition, the one part of the vent recess is recessed from the first mounting surface, and the other part of the vent recess is recessed from the bottom wall of the first mounting recess, so that the two parts of the vent recess have a height difference, and the vent recess is L-shaped. The one part of the vent recess positioned on the first mounting surface is exposed to the outside, so that the air inside the explosion-proof hole can be ensured to flow to the outside. The other part of the vent recess positioned on the bottom wall of the first mounting recess is blocked by the protective sheet, which reduces an area of the vent recess exposed to the outside and reduces the risk of foreign matter getting into the vent recess, so that the foreign matter can be effectively prevented from entering the explosion-proof hole and the explosion threshold is not affected.

Figure 2:
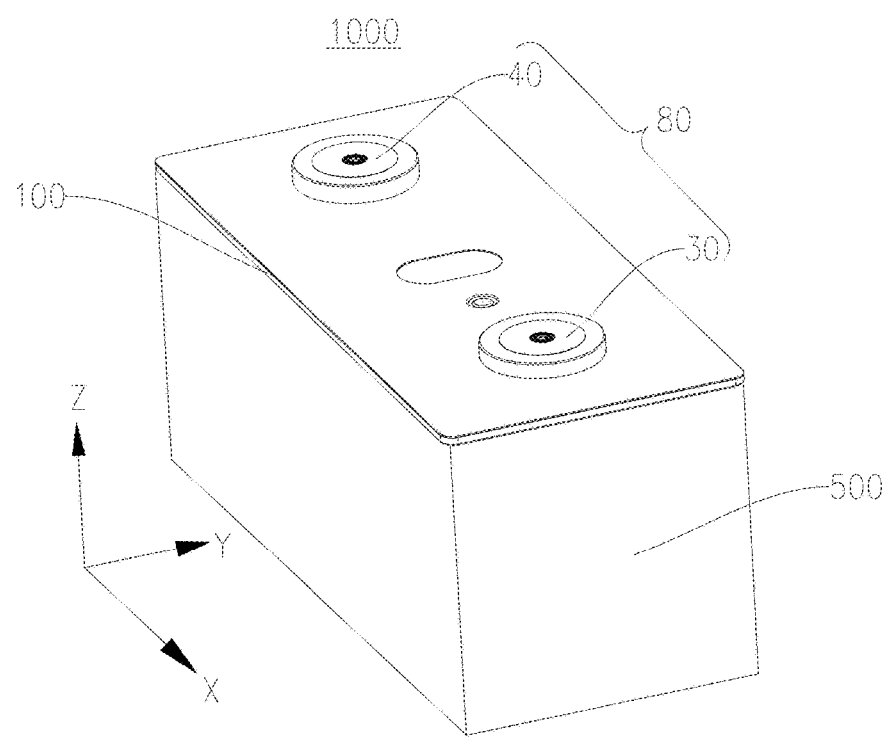
FIG. 2 is a schematic perspective structural view of the energy-storage device illustrated in FIG. 1.

Reference can be made to FIG. 1 and FIG. 2. The energy-storage device provided in implementations of the present disclosure is applicable to an energy-storage system. The energy-storage system includes an electricity conversion device (photovoltaic panel 2000), a wind energy conversion device (wind turbine 3000), a power grid 4000, and an energy-storage device 1000. The energy-storage device 1000 can be implemented as an energy-storage cabinet and can be mounted outdoors. Specifically, the photovoltaic panel 2000 can convert solar energy into electric energy during the low electricity price period, and the energy-storage device 1000 is configured to store the electricity, and to supply power to the power grid 4000 during the peak hours of energy consumption or to supply power when the power grid 4000 is powered off/out of power. The wind energy conversion device (wind turbine 3000) can convert the wind energy into electricity, and the energy-storage device 1000 is configured to store the electricity, and to supply power to the power grid 4000 during the peak hours of energy consumption or to supply power when the power grid 4000 is powered off/out of power. The electricity can be transmitted through high-voltage cables.

There can be multiple energy-storage devices 1000, the multiple energy-storage devices 1000 are connected in series or in parallel, and the multiple energy-storage devices 1000 are supported and electrically connected by isolation plates (not illustrated). In this implementation, "multiple" or "a plurality of" refers to two or more. An energy-storage box can also be disposed outside the energy-storage devices 1000 to accommodate the energy-storage devices 1000.

It can be understood that the energy-storage device 1000 can include, but is not limited to, a battery cell, a battery module, a battery pack, a battery system, etc. An actual application form of the energy-storage device provided in implementations of the present disclosure can be, but is not limited to, the products listed, and can also be other application forms. The application form of the energy-storage device 1000 is not strictly limited in implementations of the present disclosure. For illustrative purposes, in implementations of the present disclosure, the energy-storage device 1000 is a multi-cell battery.

Implementations of the present disclosure are described by taking the energy-storage device 1000 as the multi-cell battery as an example.

Figure 3:
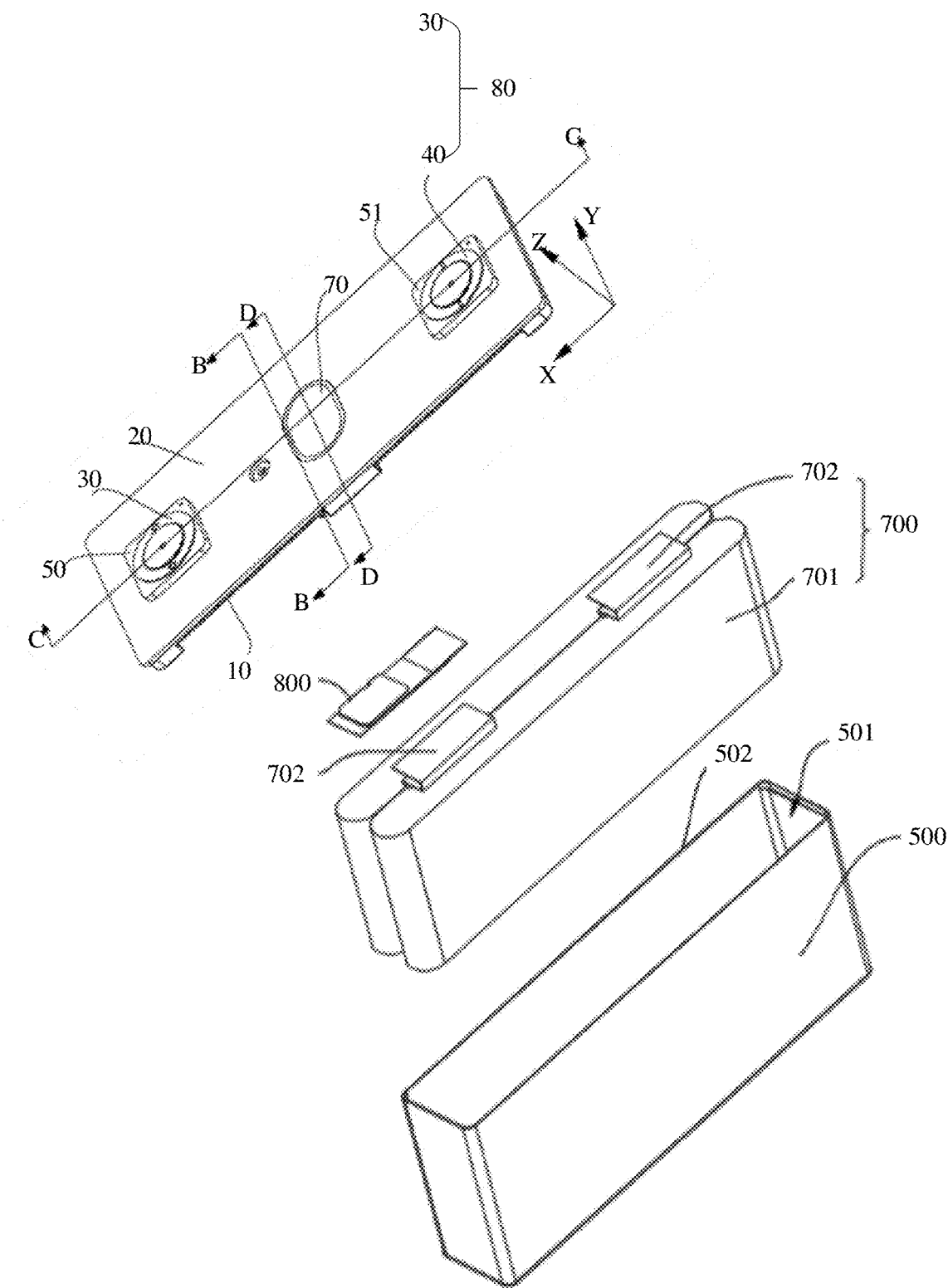
FIG. 3 is an exploded schematic structural view of the energy-storage device illustrated in FIG. 2.

Reference can be made to FIG. 2 and FIG. 3. The energy-storage device 1000 includes an end cover assembly 100, an electrode assembly 700, a connector 800, and a housing 500. The end cover assembly 100 is mounted on one end of the electrode assembly 700, and the housing 500 defines an opening 502 and an accommodating chamber 501. The accommodating chamber 501 is used to accommodate the electrode assembly 700, and the end cover assembly 100 seals the opening 502 of the housing 500. The connector 800 is connected between the end cover assembly 100 and the electrode assembly 700.

The electrode assembly 700 includes a core 701, the end cover assembly 100 includes a pole 80, the electrode assembly 700 includes a tab 702, and the pole 80 is welded and fixed to the tab through the connector 800. It can be understood that there are two poles 80, and the two poles 80 are a positive pole 30 and a negative pole 40 respectively. Correspondingly, the tab of the electrode assembly 700 includes a positive tab and 702 a negative tab 702. The positive pole 30 and the positive tab are welded and fixed to each other through a connector 800, and the negative pole 40 and the negative tab are welded and fixed to each other through another connector 800.

For ease of description, a length direction of the end cover assembly 100 illustrated in FIG. 2 is denoted as an X-axis direction, a width direction of the end cover assembly 100 is denoted as a Y-axis direction, a thickness direction of the end cover assembly 100 is denoted as a Z-axis direction, and the X-axis direction, the Y-axis direction, and the Z-axis direction are perpendicular to each other. The terms such as "upper", "top", "lower", "bottom", "left", and "right" mentioned in the description of implementations of the present disclosure are described according to directions as illustrated in FIG. 2 of the description, where a positive direction toward a Z-axis is "upper" and "top", a negative direction toward the Z-axis is "lower" and "bottom", a positive direction toward an X-axis is "right", and a negative direction toward the X-axis is "left", all of which do not constitute a limitation to the energy-storage device 1000 in actual application scenarios. The terms "same", "equal", or "parallel" used in the following are subject to certain tolerances.

Figure 4:
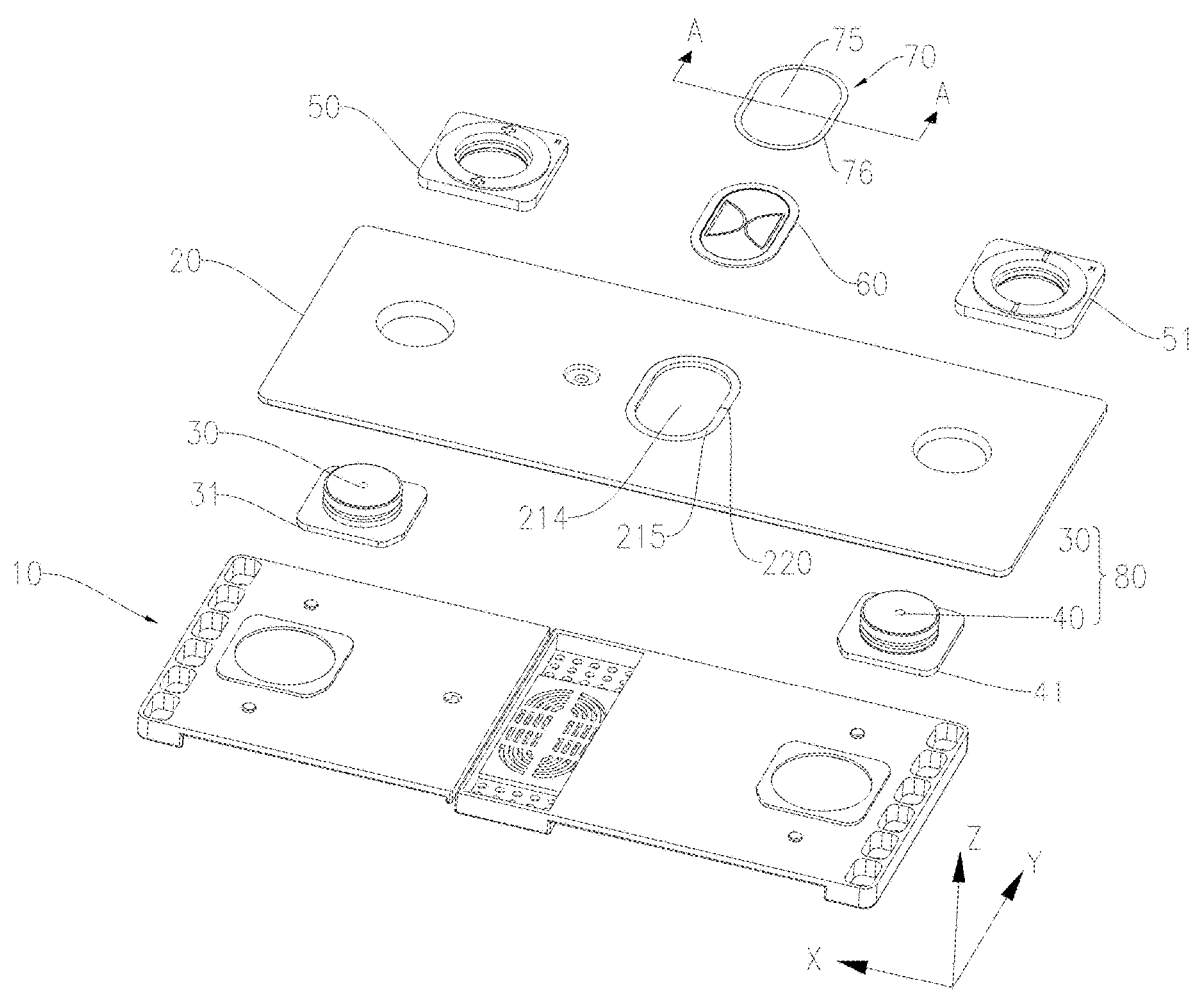
FIG. 4 is an exploded schematic structural view of the end cover assembly illustrated in FIG. 3.

Reference can be made to FIG. 3 and FIG. 4. The end cover assembly 100 includes a lower plastic 10, a top cover 20, a pole 80, a first upper plastic 50, a second upper plastic 51, an explosion-proof valve 60, and a protective sheet 70. The pole 80 includes a positive pole 30 and a negative pole 40. In implementations of the present disclosure, the top cover 20 is a smooth aluminum sheet, and the lower plastic 10 is plastic and insulated.

Figure 13:
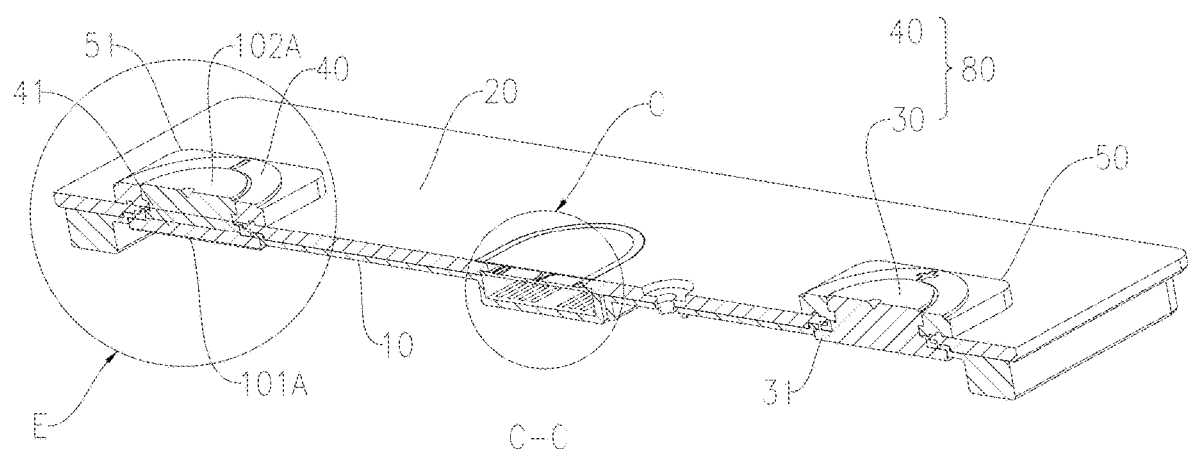
FIG. 13 is a cross-sectional view of the end cover assembly illustrated in FIG. 3, taken along a line C-C.

Reference can be made to FIG. 13, the lower plastic 10 is mounted on the top cover 20, and the lower plastic 10 is positioned between the electrode assembly 700 and the top cover 20. The pole 80 passes through the top cover 20. Specifically, the positive pole 30 passes through the top cover 20, and the negative pole 40 passes through the top cover 20. The first upper plastic 50 is fixedly connected to an upper surface of the top cover 20 and is sleeved on the positive pole 30, and the second upper plastic 51 is fixedly connected to the upper surface of the top cover 20 and is sleeved on the negative pole 40. The positive pole 30 is insulated from the top cover 20 through the first upper plastic 50, and the negative pole 40 is insulated from the top cover 20 through the second upper plastic 51. The positive pole 30 has a positive flange 31, and the negative pole 40 has a negative flange 41. The positive flange 31 is used to be electrically connected to the connector, and the negative flange 41 is used to be electrically connected to the connector.

Reference can be made to FIG. 4, the protective sheet 70 can include a protective layer 75 and an adhesive layer 76 stacked in the Z-axis direction. The protective layer 75 is used to protect the explosion-proof valve 60. The adhesive layer 76 is used to bond the protective sheet 70 to the top cover 20, and thus the protective sheet 70 is fixedly connected to the top cover 20.

In this implementation, both the explosion-proof valve 60 and the protective sheet 70 are fixedly connected to the top cover 20, and the explosion-proof valve 60 and the protective sheet 70 are stacked in the Z-axis direction. When pressure inside the energy-storage device 1000 is excessively high, the explosion-proof valve 60 can automatically open to release the pressure to prevent an explosion. The protective sheet 70 is used to protect the explosion-proof valve 60.

Figure 5:
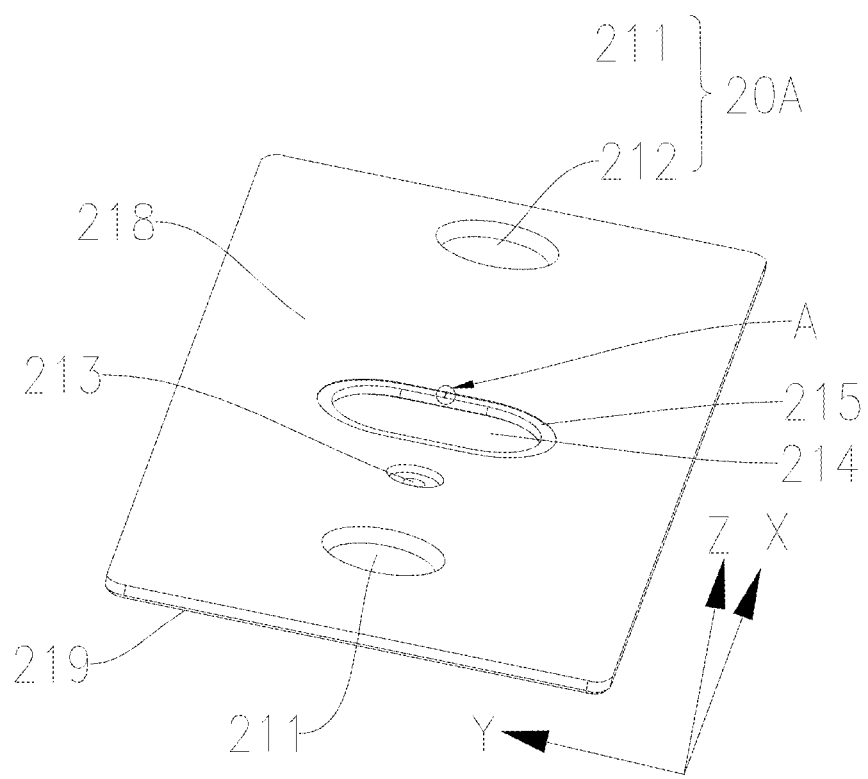
FIG. 5 is a schematic structural view of a top cover of the end cover assembly illustrated in FIG. 4.
Figure 6:
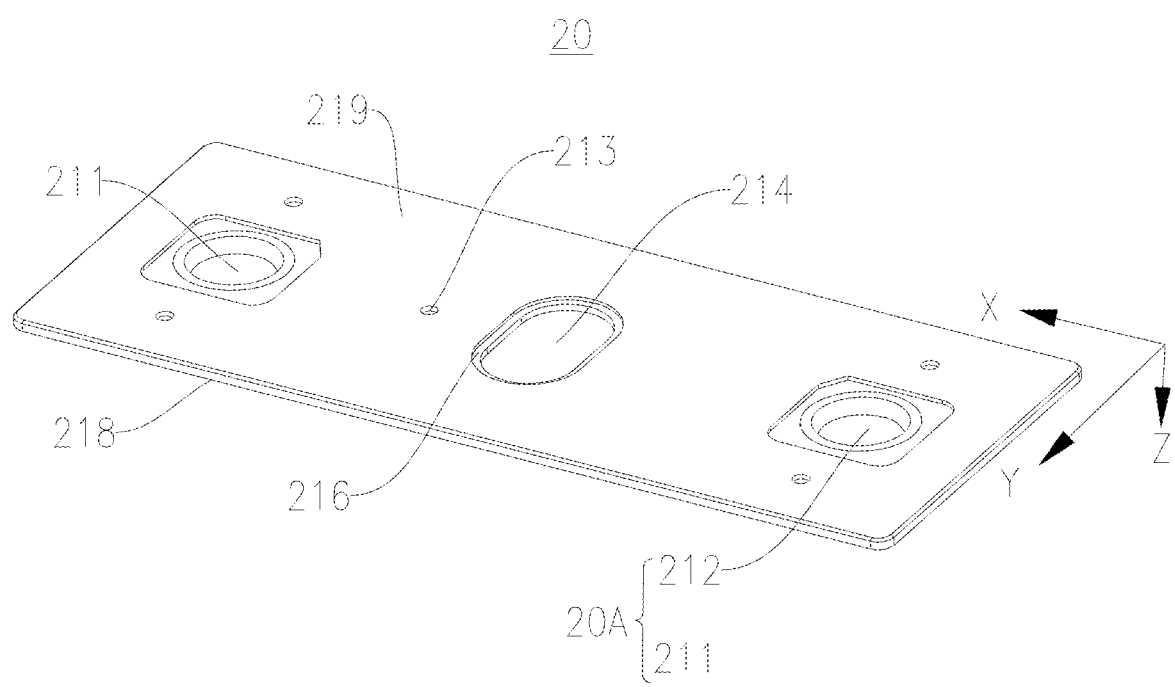
FIG. 6 is a schematic structural view of the top cover illustrated in FIG. 5, viewed from another direction.
Figure 7:
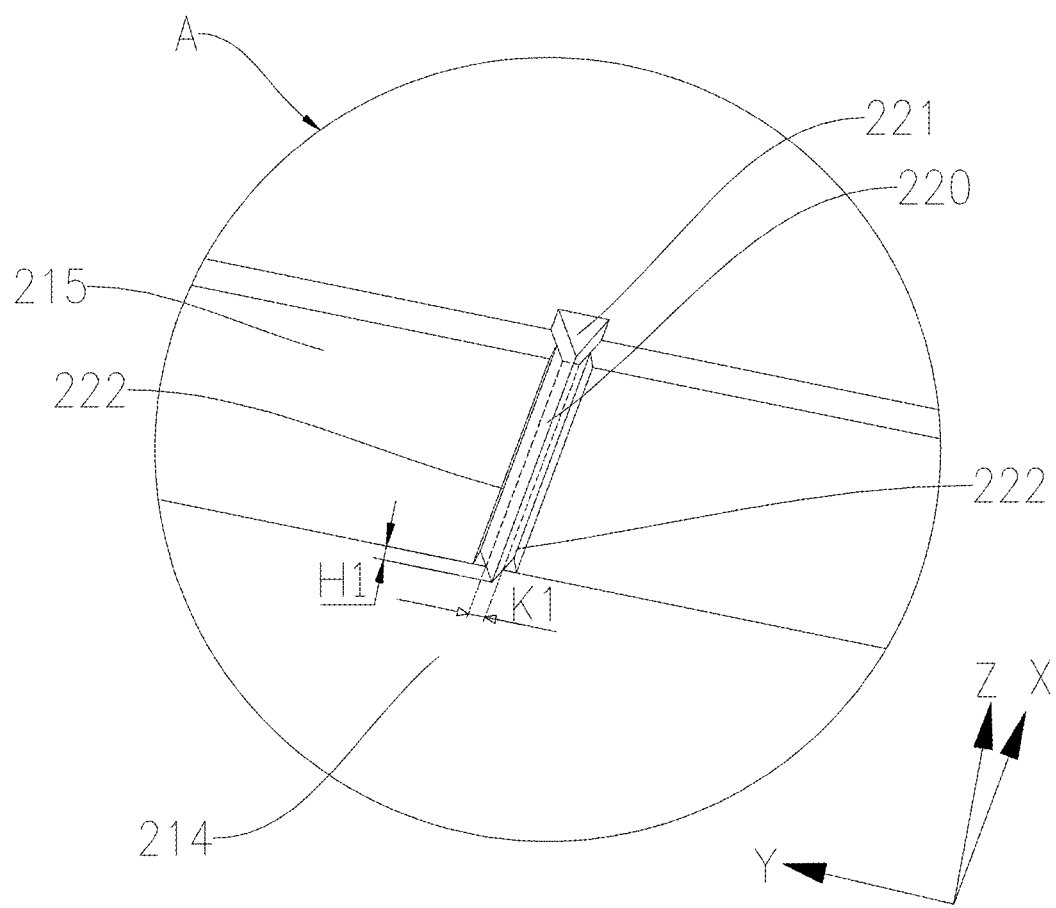
FIG. 7 is an enlarged schematic structural view of the top cover at a point A in FIG. 5.

Reference can be made to FIG. 5, FIG. 6, and FIG. 7. FIG. 5 is a front schematic view of a top cover 20, and FIG. 6 is a rear schematic view of a top cover 20. In this implementation, the top cover 20 defines two mounting holes 20A, a liquid-injection hole 213, an explosion-proof hole 214, and a vent recess 220. The mounting hole 20A is used for the pole 80 to pass through. The two mounting holes 20A are a first mounting hole 211 and a second mounting hole 212 respectively. In the X-axis direction, i.e., a length direction of the top cover 20, the first mounting hole 211, the liquid-injection hole 213, the explosion-proof hole 214, and the second mounting hole 212 are arranged in sequence and spaced apart from each other.

Specifically, the top cover 20 is a long thin plate, and the top cover 20 has a first mounting surface 218 and a second mounting surface 219 opposite to the first mounting surface 218. The first mounting hole 211 extends through the first mounting surface 218 and the second mounting surface 219, and the second mounting hole 212 extends through the first mounting surface 218 and the second mounting surface 219. It can be understood that the first mounting hole 211 and the second mounting hole 212 are positioned at two opposite ends of the top cover 20 and are used for the positive pole 30 and the negative pole 40 of the battery to pass through, respectively.

The liquid-injection hole 213 is positioned between the first mounting hole 211 and the explosion-proof hole 214. The liquid-injection hole 213 extends through the first mounting surface 218 and the second mounting surface 219. In a liquid-injection process of a power battery, electrolyte is injected into the battery through the liquid-injection hole 213 on the top cover 20. The liquid-injection hole 213 is used to accommodate a sealing plug. Specifically, the sealing plug is mounted into the liquid-injection hole 213 from the first mounting surface 218 and seals the liquid-injection hole 213.

The explosion-proof hole 214 extends through the first mounting surface 218 and the second mounting surface 219. A periphery of the explosion-proof hole 214 defines a first mounting recess 215 and a second mounting recess 216. The first mounting recess 215 is recessed from the first mounting surface 218, and the second mounting recess 216 is recessed from the second mounting surface 219. It can also be understood that the explosion-proof hole 214 extends through a bottom wall of the first mounting recess 215 and a bottom wall of the second mounting recess 216. The first mounting recess 215 is used to accommodate the protective sheet 70, and the second mounting recess 216 is used to accommodate the explosion-proof valve 60. When the explosion-proof valve 60 is accommodated in the second mounting recess 216, a bottom wall of the explosion-proof valve 60 is flush with the second mounting surface 219, making the end cover assembly 100 more compact.

The first mounting surface 218 defines the first mounting recess 215, and the first mounting recess 215 accommodates the protective sheet 70, so that a space occupied by the protective sheet 70 at least partially overlaps a space occupied by the top cover 20 in a thickness direction of the top cover 20. The second mounting surface 219 defines the second mounting recess 216, and the second mounting recess 216 accommodates the explosion-proof valve 60, so that a space occupied by the explosion-proof valve 60 at least partially overlaps the space occupied by the top cover 20 in the thickness direction of the top cover. In this way, the size of the top cover 20 in the thickness direction can be fully utilized, and the end cover assembly 100 can be more compact.

Figure 14:
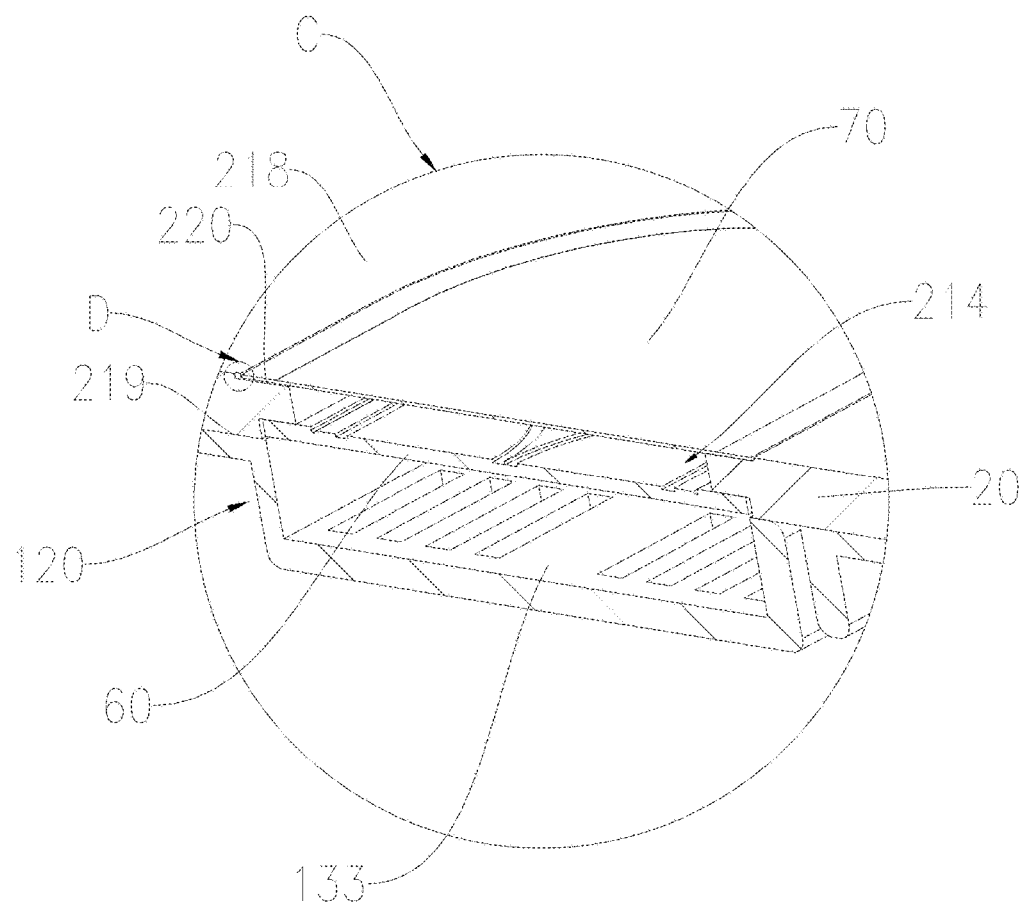
FIG. 14 is an enlarged view of the end cover assembly at a point C in FIG. 13.

Reference can be made to FIG. 14, in this implementation, when the protective sheet 70 is mounted in the first mounting recess 215 and the explosion-proof valve 60 is mounted in the second mounting recess 216, both the explosion-proof valve 60 and the protective sheet 70 seal the explosion-proof hole 214. Specifically, the protective sheet 70 seals an opening of the explosion-proof hole 214 positioned at the bottom wall of the first mounting recess 215, and the explosion-proof valve 60 seals an opening of the explosion-proof hole 214 positioned at the bottom wall of the second mounting recess 216.

Reference can be made to FIG. 7, in this implementation, the explosion-proof hole 214 is circular, and an extension direction of the vent recess 220 is substantially parallel to a radial direction of the explosion-proof hole 214. The vent recess 220 is V-shaped. The vent recess 220 is in communication with the explosion-proof hole 214 with the outside. One part of the vent recess 220 is recessed from the bottom wall of the first mounting recess 215, and this part of vent recess 220 extends through a peripheral wall of the explosion-proof hole 214, i.e., this part of the vent recess 220 is in communication with the explosion-proof hole 214. The other part of the vent recess 220 is recessed from the first mounting surface 218, and this part of the vent recess 220 recessed from the first mounting surface 218 serves as a vent 221. The vent 221 extends through a side wall of the first mounting recess 215, i.e., the vent 221 is in communication with the vent recess 220. In other words, the explosion-proof hole 214, the vent recess 220, and the vent 221 are in communication with each other in sequence, and the vent 221 is in communication with the outside. Therefore, the vent recess 220 is in communication with the explosion-proof hole 214 and with the outside.

In this implementation, the vent recess 220 is provided. When the protective sheet 70 is mounted in the first mounting recess 215, the vent recess 220 is in communication with the explosion-proof hole 214 and with the outside, so that air inside the explosion-proof hole 214 can be discharged in time after the protective sheet 70 is attached. In this way, when the protective sheet 70 is attached to the bottom wall of the first mounting recess 215, air pressure does not become larger because the air inside the explosion-proof hole 214 can be discharged in time. Therefore, an attachment position of the protective sheet 70 will not shift due to a relatively large air pressure, and the protective sheet 70 will not wrinkle under the action of the relatively large air pressure, thereby improving the accuracy of the attachment position of the protective sheet 70 and reducing the risk of wrinkling on the protective sheet 70.

In addition, even if the explosion-proof valve 60 and the protective sheet 70 seal the explosion-proof hole 214, the vent recess 220 can also be in communication with the explosion-proof hole 214 and with the outside, so that the air inside the explosion-proof hole 214 can be discharged to the outside through the vent recess 220. In this way, the air pressure in the explosion-proof hole 214 is not too large, and the air pressure in the explosion-proof hole 214 remains at normal pressure, thereby improving the accuracy of the explosion threshold of the explosion-proof valve 60.

In addition, the one part of the vent recess 220 is recessed from the first mounting surface 218, and the other part of the vent recess 220 is recessed from the bottom wall of the first mounting recess 215, so that the two parts of the vent recess 220 have a height difference, and the vent recess 220 is L-shaped. The one part of the vent recess 220 positioned on the first mounting surface 218 is exposed to the outside, so that the air inside the explosion-proof hole 214 can be ensured to flow to the outside. The other part of the vent recess 220 positioned on the bottom wall of the first mounting recess 215 is blocked by the protective sheet 70, which reduces an area of the vent recess 220 exposed to the outside and reduces the risk of foreign matter getting into the vent recess 220, so that the foreign matter can be effectively prevented from entering the explosion-proof hole 214 and the explosion threshold is not affected.

In addition, the vent recess 220 is V-shaped, i.e., two side walls of the vent recess 220 are inclined in opposite directions. The vent recess 220 is V-shaped, and when the foreign matter falls into the vent recess 220, the foreign matter may abut against the two inclined side walls, and thus a certain space is defined below the foreign matter. In this way, the vent recess 220 will not be completely blocked. Therefore, even if the foreign matter falls into the vent recess 220, the air inside the explosion-proof hole 214 can be discharged smoothly through the vent recess 220.

In this implementation, reference can be made to FIG. 7, a width K1 of the vent recess 220 gradually increases in the extension direction of the vent recess 220, and the extension direction of the vent recess 220 is roughly parallel to the radial direction of the explosion-proof hole 214. Specifically, a width of one end of the vent recess 220 close to the explosion-proof hole 214 is 0.25 mm, and a width of the other end of the vent recess 220 away from the explosion-proof hole 214 is 0.85 mm. In other words, the vent recess 220 is roughly "trumpet-shaped", so that the air inside the explosion-proof hole 214 is easy to be discharged to the outside through the vent recess 220, while outside air is difficult to enter the explosion-proof hole 214 through the vent recess 220. In this way, the air pressure in the explosion-proof hole 214 does not rise, and the air pressure in the explosion-proof hole 214 remains at normal pressure. In addition, the explosion-proof valve 60 can be prevented from being adhered to and corroded by external moist air for a long time, so that the accuracy of the explosion threshold is not affected, and the safety performance of the energy-storage device 1000 is improved.

A depth H1 of the vent recess 220 gradually increases in the extension direction of the vent recess 220. In other words, a depth of one end of the vent recess 220 close to the explosion-proof hole 214 is smaller than a depth of the other end of the vent recess 220 away from the explosion-proof hole 214, and a difference between the depth of the one end of the vent recess 220 close to the explosion-proof hole 214 and the depth of the other end of the vent recess 220 away from the explosion-proof hole 214 is 0.25 mm. More specifically, both a depth of the vent 221 and a depth of the vent recess 220 gradually increase in the extension direction of the vent recess 220, and the depth of the vent 221 is larger than the depth of the vent recess 220. A depth of one end of the vent 221 in communication with the vent recess 220 is larger than a depth of the other end of the vent 221 away from the vent recess 220. A depth of one end of the vent recess 220 in communication with the vent 221 is larger than a depth of the other end of the vent recess 220 in communication with the explosion-proof hole 214.

In this case, the air inside the explosion-proof hole 214 is easier to be discharged to the outside through the vent recess 220, while the outside air is more difficult to enter the explosion-proof hole 214 through the vent recess 220, so that the air pressure in the explosion-proof hole 214 does not rise, and the air pressure in the explosion-proof hole 214 remains at normal pressure. Meanwhile, the foreign matter can be prevented from entering the explosion-proof hole 214 through the vent recess 220, and when water vapor enters the vent recess 220, the water vapor can be collected at the bottom of the vent recess 220 and evaporate back to the outside air with heat generated by charging and discharging of the energy-storage device, so that the water vapor will not enter the explosion-proof hole 214 to corrode the explosion-proof valve 60, thereby improving the safety of the energy-storage device 1000.

Figure 11:
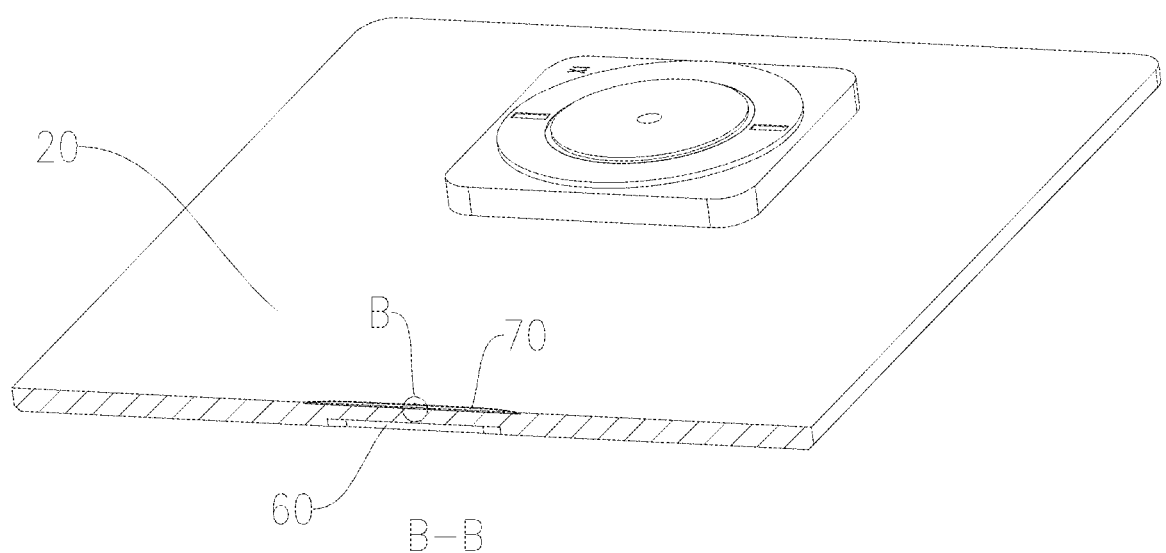
FIG. 11 is a cross-sectional view of the end cover assembly illustrated in FIG. 3, taken along a line B-B.
Figure 12:
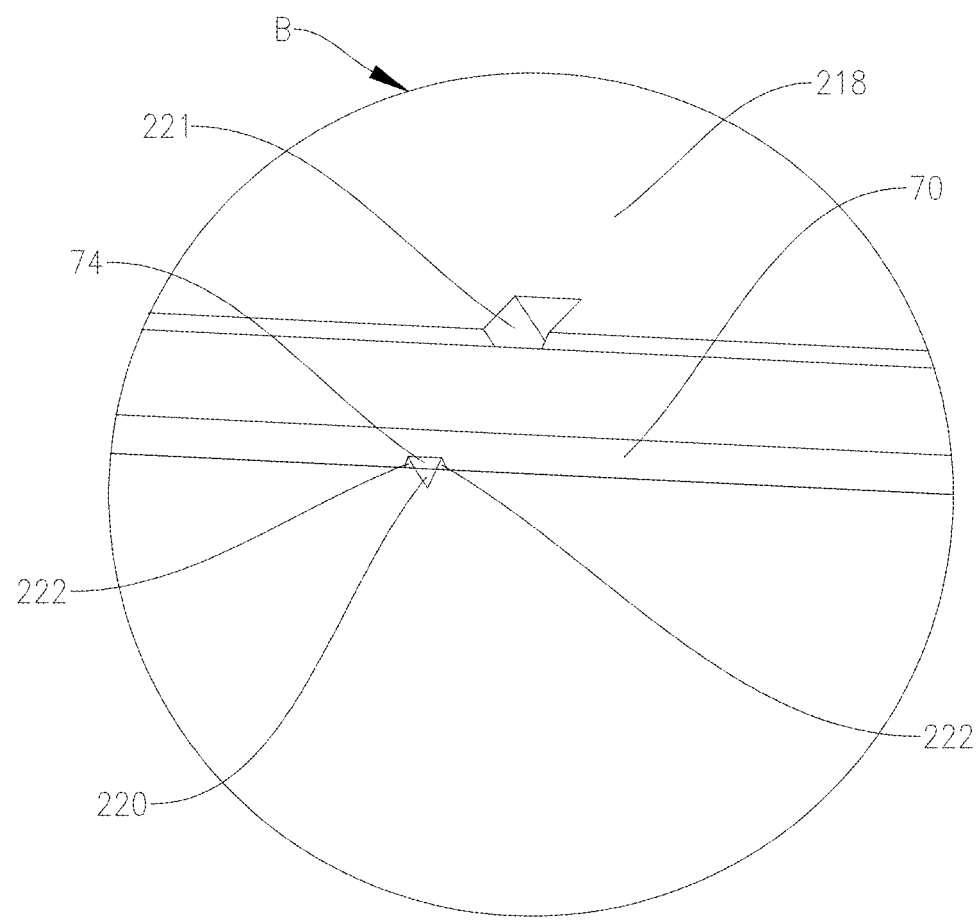
FIG. 12 is an enlarged view of the end cover assembly at a point B in FIG. 11.

Reference can be made to FIG. 7, FIG. 11, and FIG. 12, the first mounting recess 215 is provided with supporting protrusions 222 on the bottom wall of the first mounting recess 215, and the supporting protrusions 222 are disposed at two sides of the vent recess 220 in a width direction of the vent recess 220. When the adhesive layer 76 of the protective sheet 70 is adhered to the first mounting recess 215, the supporting protrusions 222 abut against the adhesive layer 76 of the protective sheet 70, so that a vent channel 74 is defined on the adhesive layer 76 of the protective sheet 70, and the vent channel 74 is positioned between the two supporting protrusions 222. In other words, the adhesive layer 76 of the protective sheet 70 only has the vent channel 74 positioned facing toward the vent recess 220, and other areas of the adhesive layer 76 of the protective sheet 70 are all separated from the vent recess 220 by the supporting protrusions 222, which prevents the other areas of the adhesive layer 76 of the protective sheet 70 from flowing downward under the action of gravity, so that the adhesive layer 76 does not block the vent recess 220, and thus the safety performance of the battery can be improved. In addition, the adhesive layer 76 of the protective sheet 70 positioned facing toward the vent channel 74 has very little adhesive, and even if the adhesive flows downward to the vent recess 220, the vent recess 220 is not blocked.

Specifically, metal around the vent recess 220 is squeezed and accumulated on the two sides of the vent recess 220 to form ridge-shaped supporting protrusions 222. When the protective sheet 70 is attached to the bottom wall of the first mounting recess 215, the adhesive layer 76 of the protective sheet 70 is supported by the ridge-shaped supporting protrusions 222 to define a larger vent channel 74, so that the adhesive layer 76 does not flow downward to block the vent recess 220 under the action of gravity, thereby improving the safety performance of the energy-storage device.

In this implementation, the vent recess 220 is formed by stamping. During a stamping process, materials around the vent recess 220 are squeezed and accumulated on the two sides of the vent recess 220 to form the supporting protrusions 222. It can be understood that the supporting protrusions 222 are two side walls of the vent recess 220, and the two side walls of the vent recess 220 are positioned facing toward each other in the width direction of the vent recess 220. The supporting protrusions 222 each protrude from a surface of the bottom wall of the first mounting recess 215.

In other implementations, the top cover 20 does not define the second mounting recess 216. In this case, the explosion-proof valve 60 can be directly attached to the second mounting surface 219.

Figure 8:
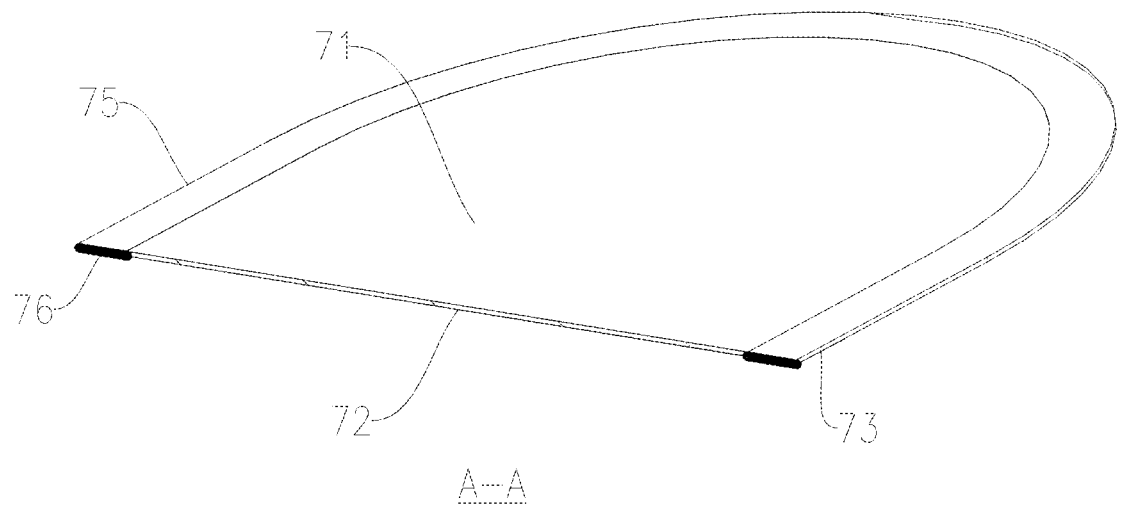
FIG. 8 is a cross-sectional schematic structure view of a protective sheet of the end cover assembly illustrated in FIG. 4, taken along a line A-A.

Reference can be made to FIG. 8, the protective sheet 70 is waist-shaped. The protective sheet 70 has a first protective surface 71, a second protective surface 72, and a protective peripheral surface 73, and the first protective surface 71 is positioned facing away from the second protective surface 72 in the Z-axis direction. The first protective surface 71 is a surface of the protective layer 75 of the protective sheet 70 away from the adhesive layer 76, and the second protective surface 72 is a surface of the adhesive layer 76 of the protective sheet 70 away from the protective layer 75. The protective peripheral surface 73 surrounds and is connected between the first protective surface 71 and the second protective surface 72.

In this implementation, reference can be made to FIG. 8, FIG. 13, and FIG. 14, the protective sheet 70 is mounted in the first mounting recess 215. Specifically, the protective sheet 70 is adhered to the bottom wall of the first mounting recess 215 through the second protective surface 72. A thickness of the protective sheet 70 is smaller than a depth of the first mounting recess 215 in the Z-axis direction. Therefore, when the protective sheet 70 is mounted in the first mounting recess 215, the protective sheet 70 is completely embedded in the first mounting recess 215, and the first protective surface 71 of the protective sheet 70 is lower than the first mounting surface 218, so that the protective sheet 70 does not fall off due to accidental scratches, thereby improving the product yield.

Figure 15:
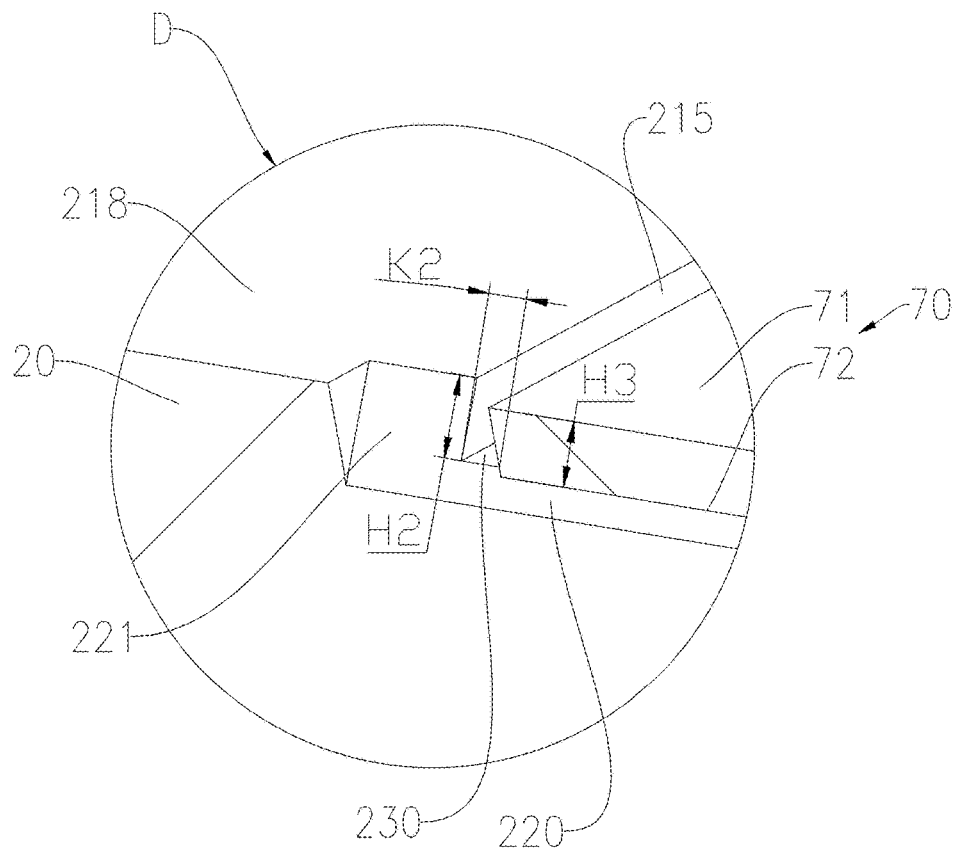
FIG. 15 is an enlarged view of the end cover assembly at a point D in FIG. 14.

Specifically, reference can be made to FIG. 15, in the Z-axis direction, a depth H2 of the first mounting recess 215 is 0.22 mm, a thickness H3 of the protective sheet 70 is 0.18 mm, and thus a height difference between the first protective surface 71 of the protective sheet 70 and the first mounting surface 218 is 0.04 mm. In this case, the protective sheet 70 can be completely embedded in the first mounting recess 215, and thus the protective sheet 70 does not exceed the first mounting recess 215. Moreover, the thickness of the protective sheet 70 can be guaranteed, and thus the protective sheet 70 has a good protective effect and is easy to process.

When the protective sheet 70 is mounted in the first mounting recess 215, the protective peripheral surface 73 of the protective sheet 70 and a side wall of the first mounting recess 215 define an avoidance gap 230, and a width K2 of the avoidance gap is 0.2 mm. The avoidance gap 230 can help the protective sheet 70 being mounted in the first mounting recess 215, and the avoidance gap 230 is in communication with the vent recess 220. In this way, the air inside the explosion-proof hole 214 can be discharged through the vent 221 and the avoidance gap 230 at the same time, so that the efficiency of discharging the air inside the explosion-proof hole 214 can be improved, and the air pressure in the explosion-proof hole 214 is not too high.

Specifically, one side of the protective peripheral surface 73 of the protective sheet 70 close to the vent recess 220 and the side wall of the first mounting recess 215 define the avoidance gap 230, so that the avoidance gap 230 can be in communication with the vent recess 220. One side of the protective peripheral surface 73 away from the vent recess 220 can abut against the side wall of the first mounting recess 215, so that the protective sheet 70 can be more fixed.

Figure 9:
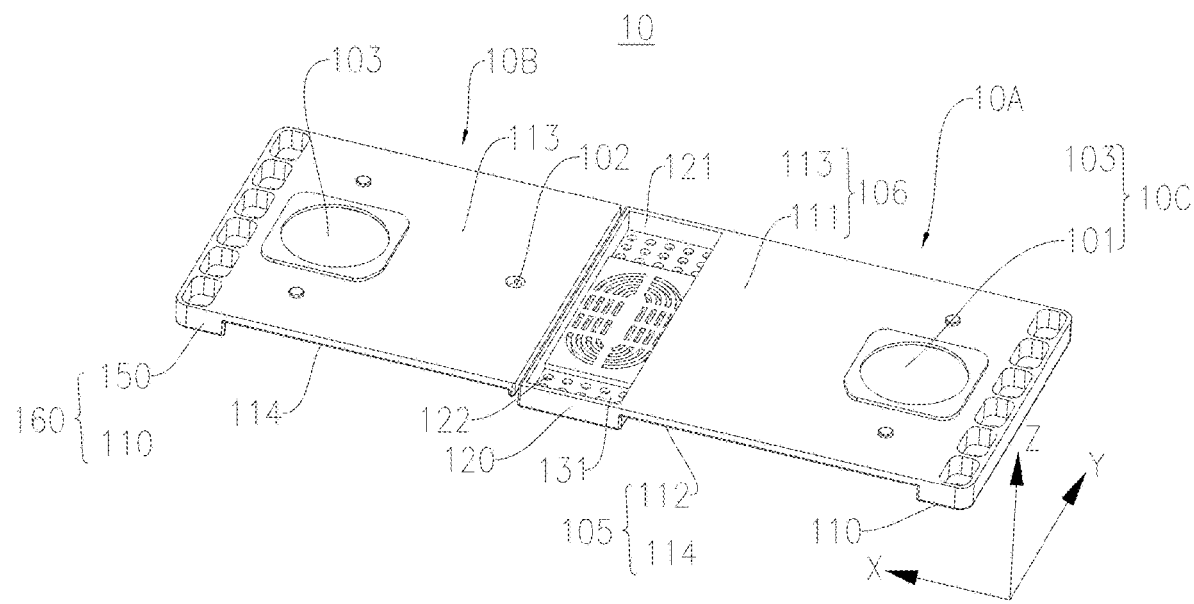
FIG. 9 is a schematic structural view of a lower plastic of the end cover assembly illustrated in FIG. 4.
Figure 10:
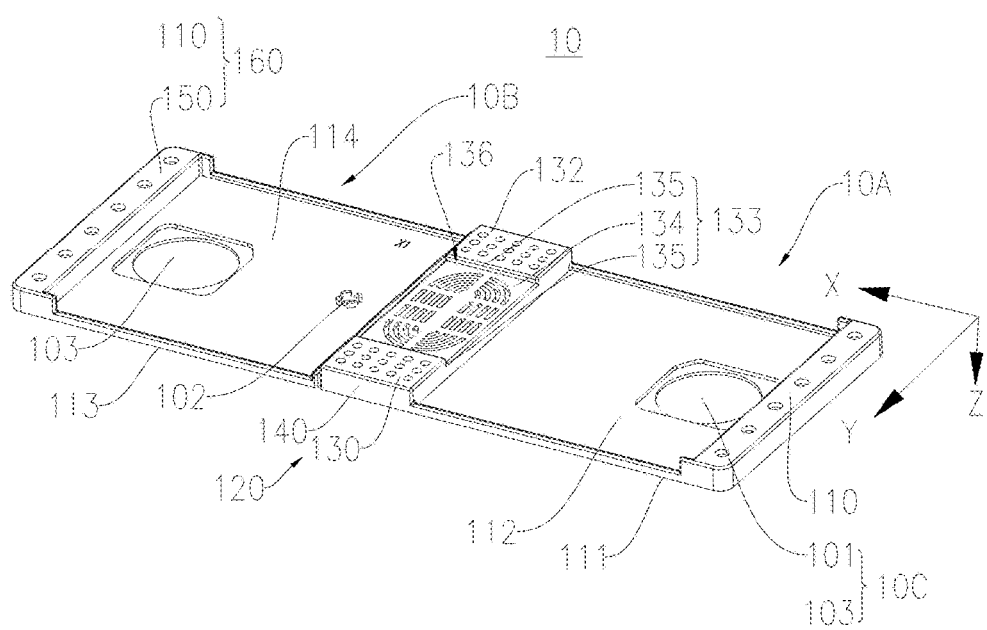
FIG. 10 is a schematic structural view of the lower plastic illustrated in FIG. 9, viewed from another direction.

In this implementation, reference can be made to FIG. 9 and FIG. 10, the lower plastic 10 has protrusions 160 and an explosion-proof grid 120. There are two protrusions 160, and the two protrusions 160 are a first protrusion 110 and a second protrusion 150 respectively. The lower plastic 10 further defines two assembly holes 10C and a liquid-injection through hole 102. The two assembly holes 10C are a first assembly hole 101 and a second assembly hole 103 respectively. Both the protrusions 160 and the explosion-proof grid 120 protrude from a lower surface 105 of the lower plastic 10, a distance between a surface of each of the protrusions 160 away from the lower surface 105 and the lower surface 105 is a first distance L1 (FIG. 17), and L1 can be 4.65 mm. The first assembly hole 101, the liquid-injection through hole 102, and the second assembly hole 103 each extend through the upper surface 106 and the lower surface 105 of the lower plastic 10.

In this implementation, the lower plastic 10 can have a first lower plastic 10A and a second lower plastic 10B. In other implementations, the lower plastic 10 can be an integrally formed member.

Both the first lower plastic 10A and the second lower plastic 10B are mounted on the bottom of the top cover 20, the first lower plastic 10A and the second lower plastic 10B are arranged in the X-axis direction, and both the first lower plastic 10A and the second lower plastic 10B are positioned between the electrode assembly and the top cover 20. The first lower plastic 10A and the second lower plastic 10B each are stacked with the top cover 20. A sum of a length of the first lower plastic 10A and a length of the second lower plastic 10B is the same as a length of the top cover 20, and a width of the first lower plastic 10A and a width of the second lower plastic 10B each are equivalent to a width of the top cover 20, where a certain tolerance range is allowed.

In this implementation, reference can be made to FIG. 9 and FIG. 10, the first lower plastic 10A is a substantially rectangular thin plate. The first lower plastic 10A has a first surface 111 and a second surface 112, and the first surface 111 is positioned facing away from the second surface 112 in the Z-axis direction. The first surface 111 is a part of the upper surface 106 of the lower plastic 10, and the second surface 112 is a part of the lower surface 105 of the lower plastic 10.

The first lower plastic 10A defines the first assembly hole 101, and the first assembly hole 101 extends through the first surface 111 and the second surface 112. The first assembly hole 101 is used for the negative pole 40 to pass through.

The first lower plastic 10A further has the first protrusion 110 and explosion-proof grid 120, and the first protrusion 110 and explosion-proof grid 120 are positioned at two opposite edges of the second surface 112 in a length direction of the second surface 112 respectively. The first protrusion 110 is close to the first assembly hole 10.

The first protrusion 110 protrudes from the second surface 112. The explosion-proof grid 120 is recessed from the first surface 111 to the second surface 112 and exceeds the second surface 112. The explosion-proof grid 120 is a rectangular frame with an opening on one side, and the explosion-proof grid 120 defines a recessed chamber 121 in communication with the opening. The opening of the explosion-proof grid 120 extends through the first surface 111 of the lower plastic 10.

In this implementation, the explosion-proof grid 120 defines multiple through holes 122. Since the tabs or a separator are easily broken and produce fragments during the transportation and use of the energy-storage device 1000, the explosion-proof grid 120 can prevent the fragments of the tabs or fragments of the separator from floating into a bottom of the explosion-proof valve 60, so that a vent channel is not blocked, and thus explosion-proof failure can be avoided. In addition, the explosion-proof grid 120 can also prevent the tabs from flowing to the explosion-proof valve 60, so that short circuits caused by electrodes being electrically connected to the top cover 20 can be avoided.

Reference can be made to FIG. 9 and FIG. 10, the explosion-proof grid 120 has an explosion-proof plate 130 and an explosion-proof peripheral plate 140. The explosion-proof plate 130 is a rectangular thin sheet, and the explosion-proof peripheral plate 140 is a rectangular ring. The explosion-proof peripheral plate 140 surrounds and is connected to an outer periphery of the explosion-proof plate 130. The explosion-proof plate 130 is positioned facing toward the opening of the explosion-proof grid 120 in the Z-axis direction. The explosion-proof plate 130 and the explosion-proof peripheral plate 140 define the recessed chamber 121. The multiple through holes 122 are defined on the explosion-proof plate 130, and the multiple through holes 122 can be circular, rectangular, arc-shaped, etc.

The explosion-proof plate 130 has an inner surface 131 and an outer surface 132 opposite to the inner surface 13 in a thickness direction of the explosion-proof plate 130, and the inner surface 131 is a bottom wall of the recessed chamber 121. The explosion-proof plate 130 defines an avoidance recess 133, and the avoidance recess 133 is recessed from the outer surface 132 to the inner surface 131 and protrudes from the inner surface 131. When the lower plastic 10 is mounted on the second mounting surface 219 of the top cover 20, the avoidance recess 133 is positioned in the middle of a side of the explosion-proof grid away from the second mounting surface 219, and the avoidance recess 133 is recessed from the second mounting surface 219 to the first mounting surface 218.

The avoidance recess 133 has a sinking portion 134 and two step-portions 135, and in a Y-axis direction, one step portion 135 is connected to one side of the sinking portion 134, and the other step portion 135 is connected to the other side of the sinking portion 134. The two step-portions 135 each have an arc-shaped connecting surface 136. Specifically, the arc-shaped connecting surface 136 is positioned on a side of the explosion-proof grid 120 away from the recessed chamber 121.

When the first lower plastic 10A is mounted on the bottom of the top cover 20, the avoidance recess 133 and the protective sheet 70 are spaced apart from and opposite to each other in the Z-axis direction. When the multiple end cover assemblies 100 are stacked, an avoidance recess 133 of one of the multiple end cover assemblies 100 is used to avoid a protective sheet 70 of another adjacent end cover assembly 100 to prevent the protective sheet 70 from falling off due to scratches by an adjacent explosion-proof plate 130, thereby increasing the product yield.

Figure 16:
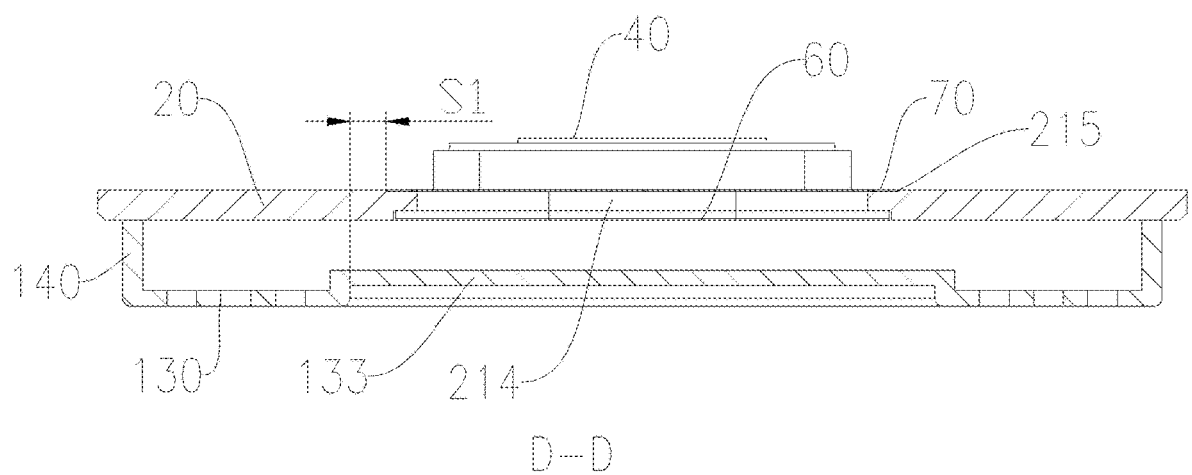
FIG. 16 is a cross-sectional view of the end cover assembly illustrated in FIG. 3, taken along a line D-D.

Reference can be made to FIG. 16, when the first lower plastic 10A is mounted on the bottom of the top cover 20, the avoidance recess 133 is positioned facing toward the protective sheet 70, the width of the first mounting recess 215 is smaller than a width of the sinking portion 134 in the Y-axis direction, and an avoidance gap S1 is defined between one step portion 135 and one side of an orthographic projection of the first mounting recess 215 on the sinking portion 134 and the other avoidance gap S1 is defined between the other step portion 135 and the other side of the orthographic projection of the first mounting recess 215 on the sinking portion 134. A width of the avoidance gap S1 is 1.9 mm. When the multiple end cover assemblies 100 are stacked, the avoidance gap S1 can prevent the two step-portions 135 of the avoidance recess 133 from scratching the protective sheet 70 of the adjacent end cover assembly 1000, thereby improving the product yield.

Reference can be made to FIG. 9 and FIG. 10, the second lower plastic 10B is a substantially rectangular thin plate, the second lower plastic 10B has a third surface 113 and a fourth surface 114, and the third surface 113 is positioned facing away from the fourth surface 114 in the Z-axis direction. The third surface 113 is a part of the upper surface 106 of the lower plastic 10, and the fourth surface 114 is a part of the lower surface 105 of the lower plastic 10. The second lower plastic 10B has the second protrusion 150, and the second protrusion 150 is positioned on one edge of the fourth surface 114 in the width direction of the fourth surface 114 and protrudes from the edge of the fourth surface 114.

The second lower plastic 10B further defines the liquid-injection through hole 102 and the second assembly hole 103, and the second assembly hole 103 is positioned between the second protrusion 150 and the liquid-injection through hole 102. The liquid-injection through hole 102 extends through the third surface 113 and the fourth surface 114, and the liquid-injection through hole 102 in communication with the liquid-injection hole 213 for the passage of the electrolyte. The second assembly hole 103 is generally a circular through hole, and the second assembly hole 103 extends through the third surface 113 and the fourth surface 114. The second assembly hole 103 is used for the positive pole 30 to pass through.

Figure 17:
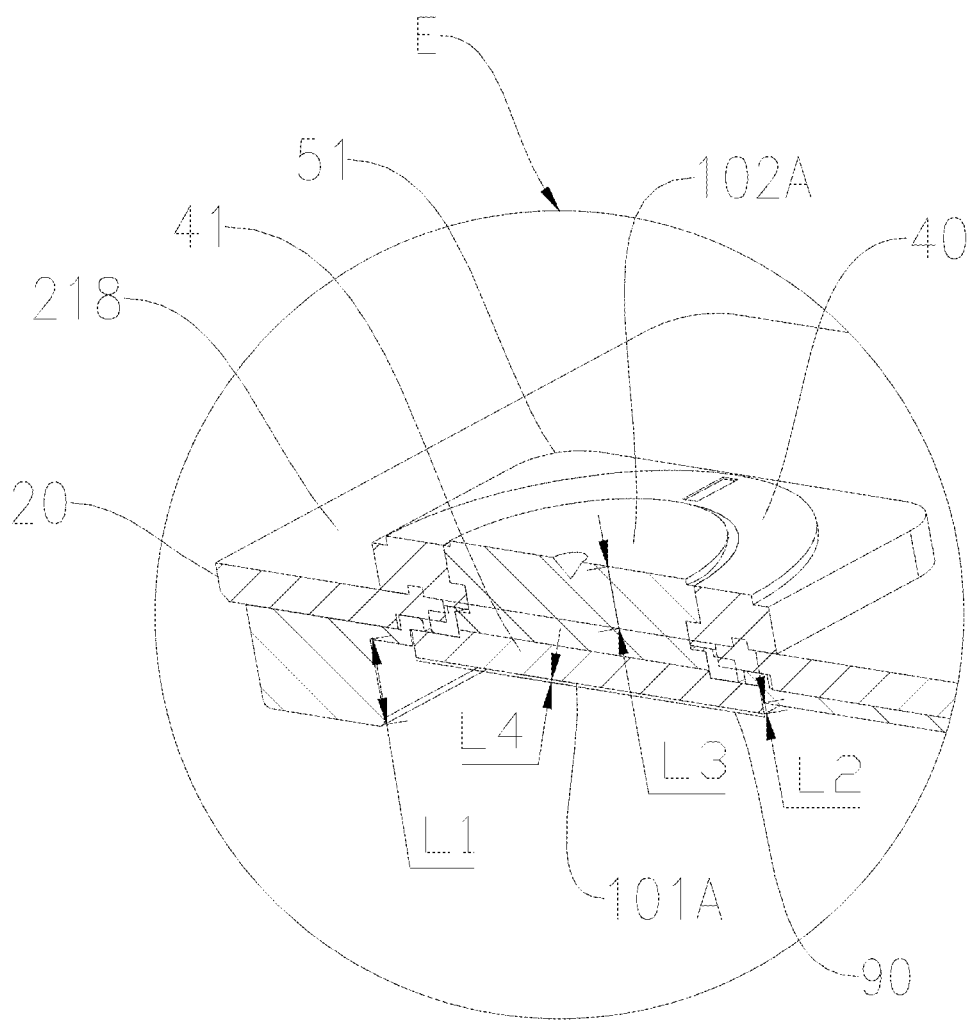
FIG. 17 is an enlarged view of the end cover assembly at a point E in FIG. 13.

In this implementation, reference can be made to FIG. 13 and FIG. 17, the lower plastic 10 is disposed on the second mounting surface 219 of the top cover 20. In the thickness direction of the top cover 20 (Z-axis direction), the liquid-injection through hole 102 of the lower plastic 10 is disposed facing toward and is in communication with the liquid-injection hole 213 of the top cover 20, and a protective cover (not illustrated) is disposed facing away from the top cover 20. The mounting hole 20A is disposed facing toward and is in communication with the assembly hole 10C, and the pole 80 passes through the mounting hole 20A and the assembly hole 10C.

The pole 80 has a first end face 101A and a second end face 102A opposite to the first end face 101A in the Z-axis direction, the first end face 101A faces the same direction as the lower surface 105 of the lower plastic 10, and the second end face 102A faces the same direction as the first mounting surface 218 of the top cover 20. Specifically, the first assembly hole 101 of the lower plastic 10 is disposed facing toward and is in communication with the first mounting hole 211 of the top cover 20, and the second assembly hole 103 of the lower plastic 10 is disposed facing toward and is in communication with the second mounting hole 212 of the top cover 20. The positive pole 30 passes through the first assembly hole 101 and the first mounting hole 211, a surface of the positive flange 31 away from the positive pole 30 is the first end face 101A, and a surface of the positive pole 30 away from the positive flange 31 is the second end face 102A. The negative pole 40 passes through the second assembly hole 103 and the second mounting hole 212, a surface of the negative flange 41 away from the negative pole 40 is the first end surface 101A, and a surface of the negative pole 40 away from the negative flange 41 is the second end surface 102A.

Reference can be made to FIG. 17, the pole 80 exceeds the lower surface 105 of the lower plastic 10, a distance between the first end surface 101A of the pole 80 and the lower surface 105 is a second distance L2, and L2 can be 0.6 mm. The pole 80 exceeds the first mounting surface 218 of the top cover 20, a distance between the second end surface 102A of the pole 80 and the first mounting surface 218 is the third distance L3, and L3 can be 3.6 mm. The second distance L2 is less than the first distance L1, and a distance between a surface of each of the protrusions 160 away from the lower surface 105 and the lower surface 105 is the first distance L1. When the pole 80 and the connector are welded, a surface of the connector will have prismatic indentations. The second distance L2 is set to be less than the first distance L1, so that the lower plastic is not scratched by the prismatic indentations of the connector, and thus the connector does not fall off, thereby preventing a short circuit inside the battery.

In this implementation, the pole 80 can be covered with a blue insulating film. Specifically, the surface of the negative flange 41 away from the negative pole 40, i.e., the first end surface 101A, is covered with a blue insulating film 90, and the blue insulating film 90 also extends to cover the lower surface 105 of the lower plastic 10. A thickness of the blue insulating film 90 is a fourth distance L4, and L4 can be 0.05 mm. The negative flange 41 is made of copper, the copper is easily oxidized when exposed to the air for a long time, and thus a copper oxide film layer with poor conductivity will be formed on the surface of the negative flange 41. Therefore, after the end cover assembly 100 is manufactured, the negative flange 41 is covered with the blue insulating film 90, which can slow down the oxidation of the negative flange 41 and prevent the negative flange 41 from being contaminated.

In this implementation, the first distance L1 is greater than a sum of the second distance L2, the third distance L3, and the fourth distance L4. In other words, a sum of a height of the pole 80 exceeding the lower surface 105 of the lower plastic 10, a height of the pole 80 exceeding the first mounting surface 218 of the top cover 20, and the thickness of the insulating film 90 is smaller than a height of the protrusions 160 protruding from the lower surface 105 of the lower plastic 10. Therefore, when the multiple end cover assemblies 100 are stacked, the negative pole 40 of the end cover assembly 100 at the lower layer does not scratch the blue insulating film 90 of the end cover assembly 100 at the upper layer.

Figure 18:
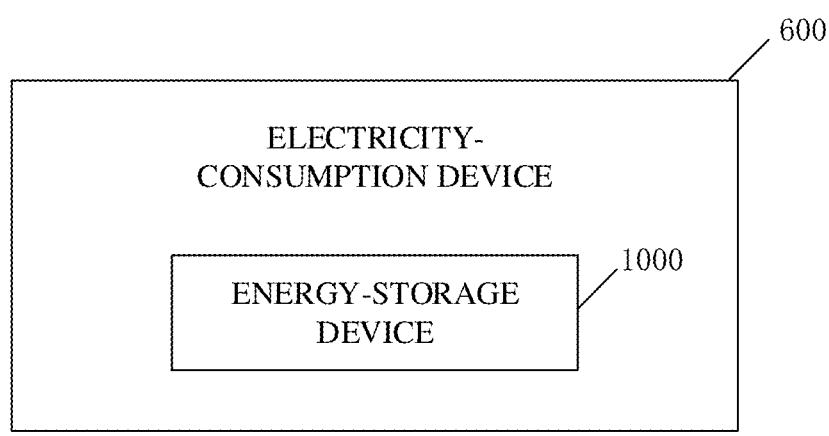
FIG. 18 is a schematic block diagram of an electricity-consumption device.

As illustrated in FIG. 18, an electricity-consumption device 600 is further provided in the present disclosure. The electricity-consumption device 600 includes the energy-storage device 1000 described above in the disclosure. The energy-storage device 1000 is configured to power the electricity-consumption device 600.

The implementations of the present disclosure are introduced in detail above, and specific examples are used herein to illustrate the principles and implementations of the present disclosure. The description of the implementations is only used to facilitate understanding of the method and core ideas of the present disclosure.

What is claimed is:

1. An end cover assembly, comprising:
   a top cover having a first mounting surface and a second mounting surface, wherein the first mounting surface is positioned facing away from the second mounting surface in a thickness direction of the top cover;
   the top cover defining a first mounting recess, an explosion-proof hole, and a vent recess, wherein the first mounting recess is recessed from the first mounting surface, the explosion-proof hole extends through a bottom wall of the first mounting recess and the second mounting surface, one part of the vent recess is recessed from the first mounting surface, the other part of the vent recess is recessed from the bottom wall of the first mounting recess, and the vent recess is in communication with the explosion-proof hole; wherein a width K1 of the vent recess gradually increases in an extension direction of the vent recess, and a width of one end of the vent recess in communication with the explosion-proof hole is smaller than a width of the other end of the vent recess away from the explosion-proof hole; and wherein a depth H1 of the vent recess gradually increases in an extension direction of the vent recess, and a depth of one end of the vent recess in communication with the explosion-proof hole is smaller than a depth of the other end of the vent recess away from the explosion-proof hole;

an explosion-proof valve being attached to the second mounting surface and covering an opening of the explosion-proof hole positioned on the second mounting surface; and a protective sheet being attached to the bottom wall of the first mounting recess and covering an opening of the explosion-proof hole positioned on the bottom wall of the first mounting recess and the other part of the vent recess; wherein the protective sheet has a protective peripheral surface, the protective peripheral surface and a side wall of the first mounting recess defines an avoidance gap, and the avoidance gap is in communication with the vent recess;

wherein a vent is defined at one end of the vent recess away from the explosion-proof hole, and the vent is recessed from the first mounting surface.

2. The end cover assembly of claim 1, wherein the first mounting recess is provided with supporting protrusions on the bottom wall of the first mounting recess, and the supporting protrusions are disposed at two sides of the vent recess in a width direction of the vent recess; and the protective sheet has a protective layer and an adhesive layer, wherein the protective layer is stacked with the adhesive layer in a thickness direction of the protective sheet, the adhesive layer is adhered to the bottom wall of the first mounting recess, the supporting protrusions abut against the adhesive layer, the adhesive layer defines a vent channel, and the vent channel is in communication with the vent recess.

3. The end cover assembly of claim 1, wherein the width of the one end of the vent recess in communication with the explosion-proof hole is 0.25 mm, and the width of the other end of the vent recess away from the explosion-proof hole is 0.85 mm.

4. The end cover assembly of claim 1, wherein a difference between the depth of the one end of the vent recess in communication with the explosion-proof hole and the depth of the other end of the vent recess away from the explosion-proof hole is 0.25 mm.

5. The end cover assembly of claim 1, wherein the protective sheet further has a first protective surface and a second protective surface, the protective peripheral surface is connected between the first protective surface and the second protective surface, and the first protective surface is positioned facing away from the second protective surface in a thickness direction of the protective sheet; and the protective sheet is accommodated in the first mounting recess, a thickness of the protective sheet is smaller than a depth of the first mounting recess in the thickness direction of the top cover, the second protective surface is fixedly connected to the bottom wall of the first mounting recess, and the first protective surface is lower than the first mounting surface.

6. The end cover assembly of claim 5, wherein a depth H2 of the first mounting recess is 0.22 mm, and a thickness H3 of the protective sheet is 0.18 mm.

7. The end cover assembly of claim 1, wherein a width K2 of the avoidance gap in a width direction of the top cover is 0.2 mm.

8. An energy-storage device comprising a housing, an electrode assembly, and an end cover assembly, wherein the housing has an opening, the housing defines an accommodating chamber, the electrode assembly is accommodated in the accommodating chamber, and the end cover assembly covers the opening, wherein the end cover assembly comprises:

a top cover having a first mounting surface and a second mounting surface, wherein the first mounting surface is positioned facing away from the second mounting surface in a thickness direction of the top cover;

the top cover defining a first mounting recess, an explosion-proof hole, and a vent recess, wherein the first mounting recess is recessed from the first mounting surface, the explosion-proof hole extends through a bottom wall of the first mounting recess and the second mounting surface, one part of the vent recess is recessed from the first mounting surface, the other part of the vent recess is recessed from the bottom wall of the first mounting recess, and the vent recess is in communication with the explosion-proof hole; wherein a width K1 of the vent recess gradually increases in an extension direction of the vent recess, and a width of one end of the vent recess in communication with the explosion-proof hole is smaller than a width of the other end of the vent recess away from the explosion-proof hole; and wherein a depth H1 of the vent recess gradually increases in an extension direction of the vent recess, and a depth of one end of the vent recess in communication with the explosion-proof hole is smaller than a depth of the other end of the vent recess away from the explosion-proof hole;

an explosion-proof valve being attached to the second mounting surface and covering an opening of the explosion-proof hole positioned on the second mounting surface; and a protective sheet being attached to the bottom wall of the first mounting recess and covering an opening of the explosion-proof hole positioned on the bottom wall of the first mounting recess and the other part of the vent recess; wherein the protective sheet has a protective peripheral surface, the protective peripheral surface and a side wall of the first mounting recess defines an avoidance gap, and the avoidance gap is in communication with the vent recess;

wherein a vent is defined at one end of the vent recess away from the explosion-proof hole, and the vent is recessed from the first mounting surface.

9. The energy-storage device of claim 8, wherein the first mounting recess is provided with supporting protrusions on the bottom wall of the first mounting recess, and the supporting protrusions are disposed at two sides of the vent recess in a width direction of the vent recess; and the protective sheet has a protective layer and an adhesive layer, wherein the protective layer is stacked with the adhesive layer in a thickness direction of the protective sheet, the adhesive layer is adhered to the bottom wall of the first mounting recess, the supporting protrusions abut against the adhesive layer, the adhesive layer defines a vent channel, and the vent channel is in communication with the vent recess.

10. The energy-storage device of claim 8, wherein the width of the one end of the vent recess in communication with the explosion-proof hole is 0.25 mm, and the width of the other end of the vent recess away from the explosion-proof hole is 0.85 mm.

11. The energy-storage device of claim 8, wherein a difference between the depth of the one end of the vent recess in communication with the explosion-proof hole and the depth of the other end of the vent recess away from the explosion-proof hole is 0.25 mm.

12. The energy-storage device of claim 8, wherein
the protective sheet further has a first protective surface and a second protective surface, the protective peripheral surface is connected between the first protective surface and the second protective surface, and the first protective surface is positioned facing away from the second protective surface in a thickness direction of the protective sheet; and
the protective sheet is accommodated in the first mounting recess, a thickness of the protective sheet is smaller than a depth of the first mounting recess in the thickness direction of the top cover, the second protective surface is fixedly connected to the bottom wall of the first mounting recess, and the first protective surface is lower than the first mounting surface.

13. The energy-storage device of claim 12, wherein a depth H2 of the first mounting recess is 0.22 mm, and a thickness H3 of the protective sheet is 0.18 mm.

14. The energy-storage device of claim 8, wherein a width K2 of the avoidance gap in a width direction of the top cover is 0.2 mm.

15. An electricity-consumption device comprising an energy-storage device, the energy-storage device being configured to power the electricity-consumption device, the energy-storage device comprising a housing an electrode assembly, and an end cover assembly, the housing having an opening, the housing defining an accommodating chamber, the electrode assembly being accommodated in the accommodating chamber, and the end cover assembly covering the opening, wherein the end cover assembly comprises:
a top cover having a first mounting surface and a second mounting surface, wherein the first mounting surface is positioned facing away from the second mounting surface in a thickness direction of the top cover;
the top cover defining a first mounting recess, an explosion-proof hole, and a vent recess, wherein the first mounting recess is recessed from the first mounting surface, the explosion-proof hole extends through a bottom wall of the first mounting recess and the second mounting surface, one part of the vent recess is recessed from the first mounting surface, the other part of the vent recess is recessed from the bottom wall of the first mounting recess, and the vent recess is in communication with the explosion-proof hole; wherein a width K1 of the vent recess gradually increases in an extension direction of the vent recess, and a width of one end of the vent recess in communication with the explosion-proof hole is smaller than a width of the other end of the vent recess away from the explosion-proof hole; and wherein a depth H1 of the vent recess gradually increases in an extension direction of the vent recess, and a depth of one end of the vent recess in communication with the explosion-proof hole is smaller than a depth of the other end of the vent recess away from the explosion-proof hole;
an explosion-proof valve being attached to the second mounting surface and covering an opening of the explosion-proof hole positioned on the second mounting surface; and
a protective sheet being attached to the bottom wall of the first mounting recess and covering an opening of the explosion-proof hole positioned on the bottom wall of the first mounting recess and the other part of the vent recess; wherein the protective sheet has a protective peripheral surface, the protective peripheral surface and a side wall of the first mounting recess defines an avoidance gap, and the avoidance gap is in communication with the vent recess;
wherein a vent is defined at one end of the vent recess away from the explosion-proof hole, and the vent is recessed from the first mounting surface.

16. The electricity-consumption device of claim 15, wherein
the first mounting recess is provided with supporting protrusions on the bottom wall of the first mounting recess, and the supporting protrusions are disposed at two sides of the vent recess in a width direction of the vent recess; and
the protective sheet has a protective layer and an adhesive layer, wherein the protective layer is stacked with the adhesive layer in a thickness direction of the protective sheet, the adhesive layer is adhered to the bottom wall of the first mounting recess, the supporting protrusions abut against the adhesive layer, the adhesive layer defines a vent channel, and the vent channel is in communication with the vent recess.

17. The electricity-consumption device of claim 15, wherein the width of the one end of the vent recess in communication with the explosion-proof hole is 0.25 mm, and the width of the other end of the vent recess away from the explosion-proof hole is 0.85 mm.

18. The electricity-consumption device of claim 15, wherein a difference between the depth of the one end of the vent recess in communication with the explosion-proof hole and the depth of the other end of the vent recess away from the explosion-proof hole is 0.25 mm.

19. The electricity-consumption device of claim 15, wherein
the protective sheet further has a first protective surface and a second protective surface, the protective peripheral surface is connected between the first protective surface and the second protective surface, and the first protective surface is positioned facing away from the second protective surface in a thickness direction of the protective sheet; and
the protective sheet is accommodated in the first mounting recess, a thickness of the protective sheet is smaller than a depth of the first mounting recess in the thickness direction of the top cover, the second protective surface is fixedly connected to the bottom wall of the first mounting recess, and the first protective surface is lower than the first mounting surface.

20. The electricity-consumption device of claim 15, wherein a width K2 of the avoidance gap in a width direction of the top cover is 0.2 mm.

* * * * *